US011720994B2

(12) United States Patent
Luo et al.

(10) Patent No.: US 11,720,994 B2
(45) Date of Patent: Aug. 8, 2023

(54) HIGH-RESOLUTION PORTRAIT STYLIZATION FRAMEWORKS USING A HIERARCHICAL VARIATIONAL ENCODER

(71) Applicant: Lemon Inc., Grand Cayman (KY)

(72) Inventors: Linjie Luo, Los Angeles, CA (US); Guoxian Song, Singapore (SG); Jing Liu, Los Angeles, CA (US); Wanchun Ma, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 33 days.

(21) Appl. No.: 17/321,384

(22) Filed: May 14, 2021

(65) Prior Publication Data
US 2022/0375024 A1 Nov. 24, 2022

(51) Int. Cl.
*G06T 3/00* (2006.01)
*G06T 11/00* (2006.01)
*G06T 5/00* (2006.01)
*G06N 3/08* (2023.01)
(Continued)

(52) U.S. Cl.
CPC .......... *G06T 3/0012* (2013.01); *G06F 18/214* (2023.01); *G06N 3/045* (2023.01); *G06N 3/08* (2013.01); *G06T 3/0006* (2013.01); *G06T 5/00* (2013.01); *G06T 11/00* (2013.01); *G06T 2207/20016* (2013.01);
(Continued)

(58) Field of Classification Search
CPC .... G06K 9/6256; G06K 9/6262; G06K 9/627; G06K 9/6267; G06N 3/0454; G06N 20/00; G06N 3/08; G06N 3/0472; G06N 20/10; G06N 3/084; G06N 3/088
See application file for complete search history.

(56) References Cited

U.S. PATENT DOCUMENTS

2018/0349743 A1* 12/2018 Iurii ................. G06V 30/19173
2020/0107072 A1* 4/2020 Lomada ................. G06N 3/084
(Continued)

FOREIGN PATENT DOCUMENTS

CN 107507126 A 12/2017
CN 111783749 A * 10/2020
CN 111862274 A * 10/2020 ........... G06N 3/0454

OTHER PUBLICATIONS

Synthesizing High-Resolution Images with StyleGAN2, Nefi Alarcon, Jun. 17, 2020 (Year: 2020).*
(Continued)

*Primary Examiner* — Ming Wu
(74) *Attorney, Agent, or Firm* — Faegre Drinker Biddle & Reath LLP

(57) ABSTRACT

Systems and method directed to an inversion-consistent transfer learning framework for generating portrait stylization using only limited exemplars. In examples, an input image is received and encoded using a variational autoencoder to generate a latent vector. The latent vector may be provided to a generative adversarial network (GAN) generator to generate a stylized image. In examples, the variational autoencoder is trained using a plurality of images while keeping the weights of a pre-trained GAN generator fixed, where the pre-trained GAN generator acts as a decoder for the encoder. In other examples, a multi-path attribute aware generator is trained using a plurality of exemplar images and learning transfer using the pre-trained GAN generator.

17 Claims, 14 Drawing Sheets

(51) Int. Cl.
*G06F 18/214* (2023.01)
*G06N 3/045* (2023.01)

(52) U.S. Cl.
CPC ............... *G06T 2207/20081* (2013.01); *G06T 2207/20084* (2013.01); *G06T 2207/30201* (2013.01)

(56) References Cited

U.S. PATENT DOCUMENTS

2020/0242771 A1   7/2020   Park et al.
2021/0097691 A1   4/2021   Liu

OTHER PUBLICATIONS

Deep learning perspective of the forward and inverse problems in exploration geophysics, 2018, Jian Sun (Year: 2018).*
Semi-supervised Image Attribute Editing using Generative Adversarial Networks, Aug. 31, 2019, Yahya Dogan, Hacer Yualim Keles (Year: 2019).*
Karras et al. (2019) "A Style-Based Generator Architecture for Generative Adversarial Networks" IEEE/CVF Conference on Computer Vision and Pattern Recognition (CVPR) Jun. 15-20, 2019, Long Beach, CA, 12 pages.
Karras et al. (2020) "Analyzing and Improving the Image Quality of StyleGAN" arXivLabs [online] Mar. 23, 2020, website: https://arxiv.org/abs/1912.04958, 21 pages.
International Search Report dated Jul. 8, 2022 in International Application No. PCT/SG2022/050221.
Larsen A. B. L. et al., "Autoencoding beyond pixels using a learned similarity metric," Proc. of the 33rd International Conference on Machine Learning, Jun. 22, 2016, vol. 48, pp. 1558-1566 [Retrieved on Jun. 15, 2022] Abstract, Figs. 1, 5, Sections 1, 2.1, 2.2, 3.
Liu K. et al., "Cells image generation method based on VAE-SGAN," Procedia Computer Science, Apr. 19, 2021, vol. 183, pp. 589-595 [Retrieved on Jun. 15, 2022] <DOI: 10.1016/J.PROCS.2021.02.101> Abstract, Section 2.3, Figs. 3-4.
Bao J. et al., "CVAE-GAN: Fine-Grained Image Generation through Asymmetric Training," Proc. of 2017 IEEE International Conference on Computer Vision (ICCV), Oct. 29, 2017, pp. 2764-2773 [Retrieved on Jun. 15, 2022] <DOI: 10.1109/ICCV.2017.299> Abstract, Section 1, Fig. 2(g).
Fregier Y. et al., "Mind2Mind : transfer learning for GANs," eprint arXiv:1906.11613, Jun. 30, 2019, pp. 1-10 [Retrieved on Jun. 15, 2022] <DOI: 10.1007/978-3-030-80209-7> Abstract, Section 4.

* cited by examiner

HIGH-RESOLUTION PORTRAIT STYLIZATION FRAMEWORKS USING A HIERARCHICAL VARIATIONAL ENCODER

BACKGROUND

Portraiture, the art of depicting the appearance of a subject, is an important art form dating back to the beginning of civilization. It has evolved beyond faithful depiction into more creative interpretations with a plethora of styles, such as abstract art, Cubism and cartoon. Automatically stylized portraiture has undergone rapid progress in recent years due to advances in deep learning. Early methods involving neural style have convincingly demonstrated the ability to transfer textural styles from an exemplar source to target images, with real photos transformed into Van Gogh or Picasso paintings. However, when it comes to portraiture, these methods largely failed to capture the important geometry-dependent motifs of different portraiture styles, thus falling short in stylization quality.

Image-to-image translation methods were later introduced to "translate" images from a source domain to a target domain using paired datasets in a supervised manner or using unpaired datasets in an unsupervised setting. These methods have been explored for portrait stylization, e.g. self-to-anime and cartoon. However, supervised approaches require paired datasets for training that would be manually onerous if not infeasible, while the unsupervised approaches not only need a large amount of unpaired data, but also often face difficulties with stable training convergence and in generating high-resolution results. A recent portrait stylization pipeline, Toonify, builds on a pre-trained model of the high-resolution generative neural network StyleGAN2. Using a few hundred unpaired exemplars, Toonify generates promising results in cartoon style by employing transfer learning to adapt StyleGAN2 to the given style exemplars. When given an input image, the corresponding latent code is obtained by an optimization-based inversion in one of the StyleGAN2 latent spaces, which is then used to generate the stylized output via the adapted StyleGAN2 model. Despite its strong generalization ability given only limited exemplars, the stylization of real input images (in contrast to StyleGAN2 realistically synthesized ones) may include various artifacts, likely due, at least in part, to the sub-optimality of the inversion method used. That is, while Toonify's inverse mapping may work well for reconstructing real faces, it is not very robust to different styles.

It is with respect to these and other general considerations that embodiments have been described. Although relatively specific problems have been discussed, it should be understood that the examples described herein should not be limited to solving the specific problems identified in the background above.

SUMMARY

Portraiture as an art form has evolved from realistic depiction into a plethora of creative styles. While substantial progress has been made in automated stylization, generating high quality stylistic portraits is still a challenge, and even the recent popular Toonify stylization platform suffers from several artifacts when used on real input images. Such StyleGAN-based methods have focused on finding the best latent inversion mapping for reconstructing input images; however, focusing on finding the best latent inversion mapping for reconstructing input images has not led to good generalization for different portrait styles. In accordance with examples of the present disclosure, an AgileGAN framework is proposed that generates high quality stylistic portraits via inversion-consistent transfer learning. The AgileGAN framework includes a hierarchical variational autoencoder; the hierarchical variational autoencoder generates an inverse mapped distribution that conforms to the original latent Gaussian distribution provided by a StyleGAN-based network, while augmenting the original latent space to a multi-resolution latent space so as to provide encoding for different levels of detail. To better capture attribute dependent stylization of facial features, the AgileGAN framework includes an attribute-aware generator; the attribute-aware generator may adopt an early stopping strategy to avoid overfitting small training datasets. Such an architecture provides greater agility in creating high quality and high resolution (e.g., 1024×1024) portrait stylization models. Further, such models can operate on a limited number of style exemplars (for example, around 100 exemplar images) and therefore can be trained in a shorter amount of time (e.g., ~1 hour). In accordance with examples described herein, enhanced portrait stylization and quality can be achieved when compared to previous state-of-the-art methods. Further, such techniques may be applied to applications that include but are not limited to image editing, motion retargeting, pose, and video applications. Additional information about GAN networks, including StyleGAN-based networks and StyleGAN2 can be found in the following printed papers: "A Style-Based Generator Architecture for Generative Adversarial Networks" to T. Karras, S. Laine, and T. Aila., in Proc. IEEE/CVF Conference on Computer Vision and Pattern Recognition, 2019 and "Analyzing and Improving the Image Quality of StyleGAN" to T. Karras, S. Laine, M. Aittala, J. Hellsten, J. Lehtinen, and T. Aila, in Proc. IEEE/CVF Conference on Computer Vision and Patter Recognition, 2020 both of which are incorporated herein by reference, for all that they teach and all purposes.

In accordance with at least one example of the present disclosure, a method for generating a stylized image is described. The method may include receiving an input image; encoding the input image using a variational autoencoder to obtain a latent vector; providing the latent vector to a generative adversarial network (GAN) generator; generating, by the GAN generator, a stylized image from the GAN generator; and providing the stylized image as an output.

In accordance with at least one example of the present disclosure, a system for generating a stylized image is described. The system may include a processor; and memory including instructions, which when executed by the processor, causes the processor to: receive an input image; encode the input image using a variational autoencoder to obtain a latent vector; provide the latent vector to a generative adversarial network (GAN) generator; generate, by the GAN generator, a stylized image from the GAN generator; and provide the stylized image as an output.

In accordance with at least one example of the present disclosure, a computer-readable storage medium including instructions is described. The instructions, which when executed by a processor, cause the processor to: receive an input image; encode the input image using a variational autoencoder to obtain a latent vector; provide the latent vector to a generative adversarial network (GAN) generator; generate, by the GAN generator, a stylized image from the GAN generator; and provide the stylized image as an output.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
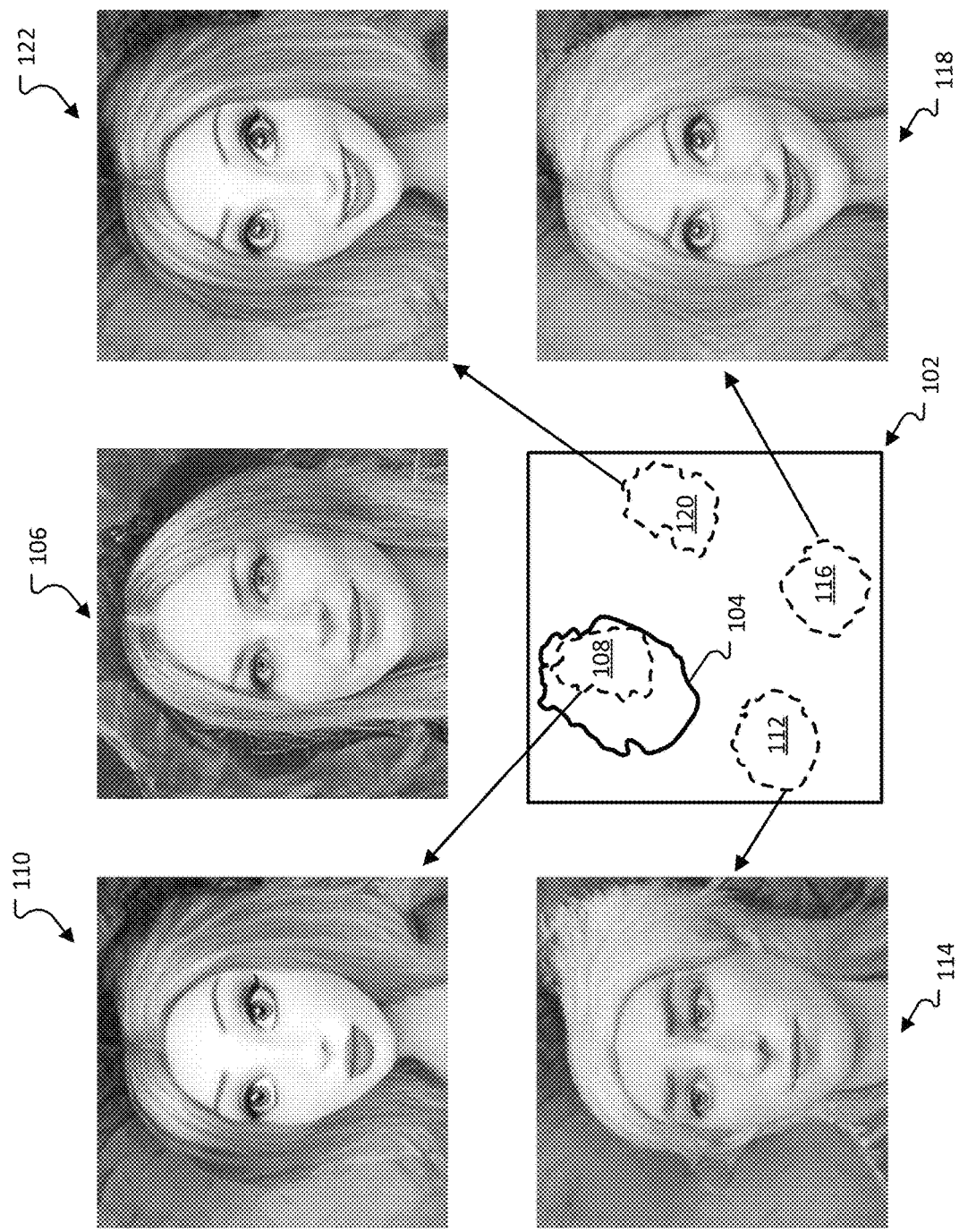
FIG. 1 depicts an example of a t-Distributed Stochastic Neighbor Embedding (t-SNE) visualization of latent code distributions for different inversion methods and the relation to stylized image quality in accordance with examples of the present disclosure.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Stylizing facial images in an artistic manner has been explored in the context of non-photorealistic rendering. Early approaches relied on low level histogram matching using linear filters. Neural style transfer, by matching feature statistics in convolutional layers, led to early exciting results via deep learning. Since then, several improvements directed to enforcing local patterns in deep feature space via a Markov random field (MRF) and extending style transfer to video and improved the quality by imposing temporal constraints have been proposed. Although these methods can achieve generally compelling results for several artistic styles, they usually fail on styles involving significant geometric deformation of facial features, such as cartoonization. For more general stylization, image-to-image (I2I) translation may be used to translate an input image from a source domain to a target domain.

Conditional generative adversarial networks (GAN) may be implemented to learn the input-to-output mapping. Similar ideas have been applied to various tasks, such as sketches-to-photographs and attribute-to-images. However, these methods require paired training data, which is hard to obtain. To avoid this, conditional image generation has been used in an unsupervised manner. For example, the well-known cycle-consistency loss in CycleGAN has been proposed to improve network training stability for the unpaired setting. Unsupervised methods have also been used in cartoonization. Further, CycleGAN has been extended to cross-domain anime portrait generation, and other unsupervised methods have incorporated an attention module and a learnable normalization function for cartoon face generation, where their attention-guided model can flexibly control the amount of change in shape and texture. Although these methods can conduct plausible image translation, such networks require extensive training data, and thus most were trained for relatively low image resolutions.

Recently, a GAN interpolation framework for controllable cross-domain image synthesis, called Toonify, has been proposed to generate photo-realistic cartoonization. However, Toonify's inversion mapping when applied to real images may introduce undesired artifacts in the stylized output. In contrast, examples of the present disclosure utilize a variable autoencoder (VAE) inversion which enhances distribution consistency in latent space, leading to better results for real input images.

GANs have been used to synthesize images that ideally match the training dataset distribution via adversarial training. GANs have been applied to various areas, including but not limited to image inpainting, image manipulation, and texture synthesis. Various advancements have been made to improve the architecture, synthesis quality, and training stability of GANs. However, initial methods were mainly limited to low resolutions due to computational cost and shortage of high-quality training data. A high-quality human face dataset, CelebAMask-HQ, was collected, and a Pro-GAN architecture was proposed to train GANs for high resolution image generation via a progressive strategy. The ProGAN architecture generates realistic human faces at a high resolution of 1024×1024. Similarly, a high resolution human face dataset called Flickr-Faces-HQ (FFHQ), was collected and a generator architecture called StyleGAN was proposed, inspired by adaptive normalization for style transfer. StyleGAN further improves face synthesis quality to a level that is almost indistinguishable from real photographs. StyleGAN has been extended to StyleGAN2, which reduced artifacts and improved disentanglement using perceptual path length. Examples of the present disclosure build upon StyleGAN2 and leverage StyleGAN2's pre-trained weights as initialization.

Since GANs are typically designed to generate realistic images by sampling from a known distribution in latent space, GAN inversion addresses the complementary problem of finding the most accurate latent code, when given an input image, that will reconstruct that image. One approach is based on optimization, which is directly optimizing the latent code to minimize the pixel-wise reconstruction loss for a single input instance. Another approach is learning-based, in which a deterministic model is trained by minimizing the difference between the input and synthesized images. Other works combine these the optimization and learning-based approaches by learning an encoder that produces a good initialization for subsequent optimization. In addition to image reconstruction, some examples also use inversion when undertaking image manipulation. For example, a hybrid method may encode images into a semantic manipulable domain for image editing. In addition, a generic Pixel2Style2Pixel (PSP) encoder has been proposed; such an encoder is based on a dedicated identity loss for embedding images in several real image translation tasks, such as inpainting and super resolution. However, the processes used by the PSP encoder for single domain manipulation or reconstruction may not be directly applicable to cross-domain generation due to insufficient consistency in the latent distributions, which is addressed by the examples provided herein.

Training a modern high-quality, high-resolution GAN typically requires a large number of images (e.g., $10^5$ to $10^6$), which is a costly undertaking in terms of acquisition, processing, and distribution. There are a few techniques to reduce such requirements. For example, a few-shot learning technique has been proposed to perform appearance translation without needing a large dataset of specific style translation pairs. However, a pre-trained style embedding network is required and the generated image resolution is limited. Conversely, the idea of patch-based training has been explored, as less training data is needed when learning patch distributions. However, such techniques may not easily be relevant to portrait generation, since human faces have strong geometry semantics and may not simply be reduced to smaller patches for training. To address the issue of data shortage, examples presented herein are based on applying transfer-learning to the StyleGAN-based architecture and adopting and an early stopping strategy to generate optimal results.

As previously mentioned, finding the best inversion mapping in terms of reconstruction in the original StyleGAN2 is in fact misguided, because what may be best for realistic image generators may not be best for other stylized generators. Instead, a learned inversion mapping that also optimizes for matching the distribution of latent codes to the Gaussian latent distribution in the original StyleGAN2 may lead to better results across a range of different stylized generators. In other words, matching latent distributions when learning the inversion leads to robust embedding across different styles, and is better than aiming for the best reconstruction embedding for realistic images.

FIG. 1 depicts an example of a t-Distributed Stochastic Neighbor Embedding (t-SNE) visualization 102 of latent code distributions for different inversion methods and the relation to stylized image quality in accordance with examples of the present disclosure. t-SNE is a technique for dimensionality reduction that is particularly well suited for the visualization of high-dimensional datasets. The original StyleGAN2 latent distribution is depicted as latent distribution 104. When stylizing an input image, such as the input image 106, using a model as described herein having a latent code distribution 108 that is aligned to or otherwise overlaps the original latent distribution 104 leads to more pleasing results. That is, a stylized portrait 110 may be generated from the input image 106 using a Hierarchical Variational Autoencoder (hvAE) as described herein according the embodiments of the present disclosure, where the stylized portrait 110 is generated using a model having a latent code distribution 108 that is aligned to and/or overlaps the original StyleGAN2 latent distribution 104. The t-SNE visualizations 102 also depicts other latent code distributions that may be used by other stylizing models when stylizing an input image 106. For example, the Toonify model may utilize the latent code distribution 112 when generating the stylized image 114. The latent code distribution 112 is not aligned to or otherwise does not overlap the original StyleGAN2 latent distribution 104. As another example, a PSP model may utilize the latent code distribution 116 when generating the stylized image 118. The latent code distribution 116 is not aligned to or otherwise does not overlap the original StyleGAN2 latent distribution 104. Similarly, an in-domain model may utilize the latent code distribution 120 when generating the stylized image 122. The latent code distribution 120 is not aligned to or otherwise does not overlap the original StyleGAN2 latent distribution 104. Because the latent code 112, 116, and 120 is not aligned to or otherwise does not overlap the original StyleGAN2 latent distribution 104, the inversion mapping when applied to real images as input often introduces undesired artifacts in the stylized output image. For example, geometric deformations of facial features may be visible in the output stylized output image.

In accordance with examples of the present disclosure, AgileGAN—an inversion-consistent transfer learning framework for portrait stylization, as described herein, includes an (hVAE) and an attribute-aware generator that works on a limited number of exemplars. Such framework generates high quality and high resolution portrait stylization models in a variety of target styles. To achieve inversion consistency in the described AgileGAN framework, a hierarchical hVAE is used to perform the inversion. Compared to other latent space inversion techniques that may operate on the less entangled latent space W, using the hVAE ensures that the mapping conforms to the multi-variate Gaussian distribution of the original GAN latent space, such as but not limited to a StyleGAN-based model. Furthermore, the hVAE is hierarchical in that the StyleGAN-based model's original Z latent space is augmented to a multi-resolution latent space Z+ to better encode different levels of detail in the image. Using the Z+ augmentation and hVAE significantly improves stylization quality.

To improve the training efficiency with a high resolution dataset, the training process is decomposed into two stages. In the first stage, the hVAE is trained for inversion encoding using the original StyleGAN-based model (e.g., StyleGAN2) as the decoder with fixed pre-trained weights. During such training, losses including the reconstruction loss, user identity loss, perceptual loss, and KL divergence loss are enforced for the VAE. In the second stage, latent codes are sampled in the Z+ space from a multi-variate Gaussian distribution; an attribute-aware generator is then fine-tuned starting from the StyleGAN-based model's (e.g., StyleGAN2) pre-trained weights. The training losses include an adversarial loss with the given style exemplars, a facial structural loss, as well as R1 and perceptual path-length regularization losses. The attribute-aware generator includes multiple generative paths for different attributes (e.g. hair color, hair length, etc.) and multiple discriminators to better capture attribute-dependent stylization of facial features. To avoid overfitting caused by a small training dataset, and to better balance identity and style, an early stopping strategy in training the StyleGAN-based model is adopted. During inference, the stylized output from an input image can be generated using the hVAE encoder and the attribute-aware generator.

Figure 2:
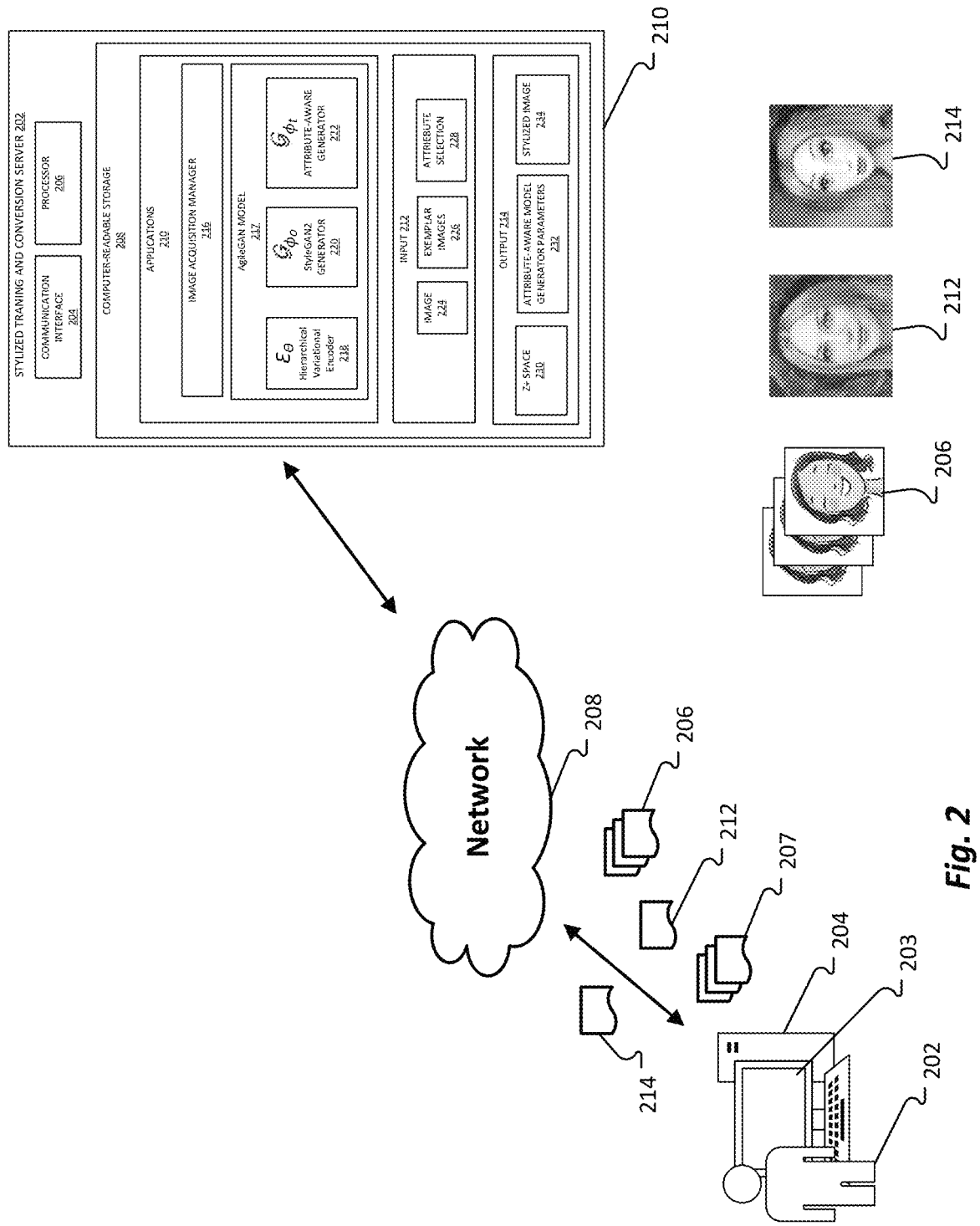
FIG. 2 depicts aspects of the stylized training and stylized image generation system in accordance with examples of the present disclosure.

FIG. 2 depicts aspects of the stylized training and stylized image generation system 200 in accordance with examples of the present disclosure. The stylized training and stylized image generation system 200 generally includes a computing device 204 communicatively coupled to a stylized training and conversion server 210 via a network 208. In examples, a user 202 may select a plurality of training images 206 and provide the plurality of training images 206 to the stylized training and conversion server 210 to train an hVAE. In addition, the user 102 may provide the plurality of exemplar images 207 to the stylized training and conversion server 210 to train a stylization model, such as an AgileGAN model 217, with a style and/or attribute exhibited by the plurality of exemplar images 207. For example, the plurality of exemplar images 207 may correspond to examples of cartoon characters, animals, etc. In some examples, the plurality of exemplar images 207 may be specific to a particular attribute that the user 102 would like enhanced or otherwise prefer to see in the resulting stylized images. For example, the plurality of exemplar images 207 may exhibit one or more of a specific hair color, facial appearance, hair length, pose, lighting condition, etc. The stylized training and conversion server 210 may utilize transfer learning to train a pre-trained GAN model (e.g., StyleGAN2 and/or StyleGAN-based), and therefore a GAN generator 220, using the plurality of exemplar images 207. In some examples, following training, the stylized training and conversion server 210 may output a trained AgileGAN model including a trained hVAE 218 and generator 220. The hVAE 218 may be trained using a large quantity of high-quality images. Alternatively, or in addition, the stylized training and conversion server 210 may receive one or more input images 212, generate one or more stylized images 214 based on the one or more input images 212, and provide the one or more stylized images 214 to the computing device 204 of the user 102. The one or more stylized images 214 may be displayed at a user interface 203 of the computing device 204.

Figure 3:
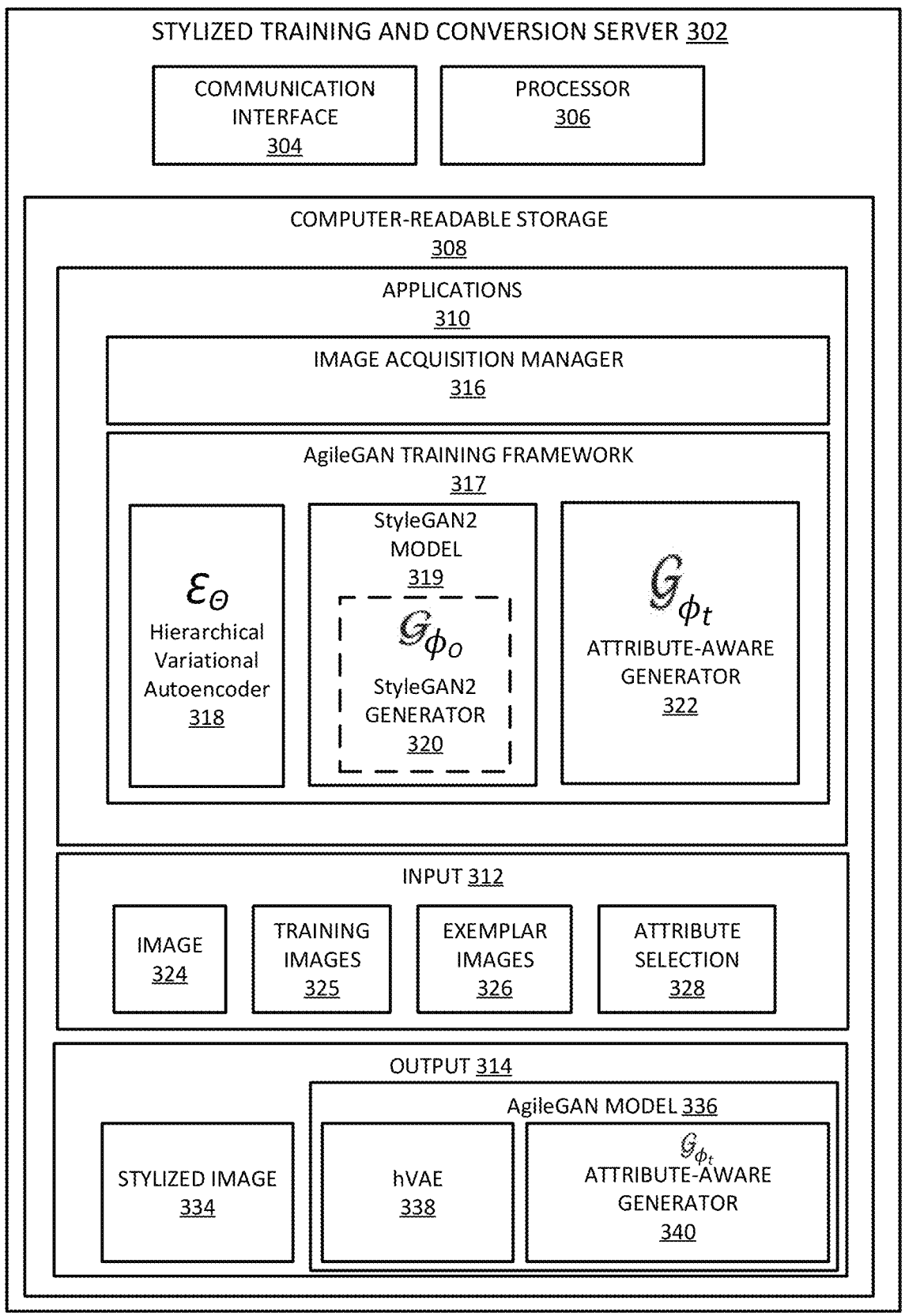
FIG. 3 depicts additional details of the stylized training and conversion server in accordance with examples of the present disclosure.

FIG. 3 depicts details of the stylized training and conversion server 302 in accordance with examples of the present disclosure. More specifically, the stylized training and conversion server 302 may be the same as or similar to the stylized training and conversion server 210 previously discussed. The stylized training and conversion server 302 may include a communication interface 304, a processor 306, and a computer-readable storage 308. In examples, the communication interface 304 may be coupled to a network and receive the plurality of training images 325, the plurality of exemplar images 326, and one or more input images 324 for stylization. The image acquisition manager 316 may manage the acquisition of the images, and in some instances, may perform preprocessing of the images to ready for training and/or stylization. The image 324 may be the same as or similar to the input image 212 (FIG. 2); the training images 325 may be the same as or similar to the training images 206 (FIG. 2); and the exemplar images 326 may be the same as or similar to the exemplar images 207 (FIG. 2). In some examples, one or more attribute selections may be received at the communication interface 304 and stored as an attribute selection 328. For example, an explicit attribute for hair color, etc. may be received as an attribute selection 328. While the image 324, training images 325, exemplar images 326, and attribute selection 328 are depicted as being input 312, other information and input may be received at the communication interface 304 and stored as input 312. For example, one or more model parameters (e.g., hyperparameters, model configurations, Z+ spaces, etc.) may be received at the communication interface 304 and stored as input 312.

The stylized training and conversion server 302 includes an AgileGAN training framework 317 for training the hVAE 318 and the attribute-aware generator 322. The AgileGAN training framework 317 may include a pre-trained GAN model (e.g., StyleGAN-based model and/or StyleGAN2 model) 319 including a pre-trained GAN generator 320 (e.g., StyleGAN-based generator and/or StyleGAN2 generator). In examples, the hVAE 318 and the attribute-aware generator 322 may be trained independently of one another. Using the training images 325 together with the GAN generator 320, the hVAE 318 may be trained for inversion by learning the posterior distribution of the GAN model 319 using the fixed pre-trained GAN model 319 as a decoder. Given a small set of stylistic exemplars, for example those exemplar images stored as exemplar images 326, the AgileGAN training framework 317 can utilize transfer learning to train the attribute-aware generator 322 using the pre-trained GAN model 319 and the pre-trained GAN generator 320. Accordingly, the stylized training and conversion server 302 can output an AgileGAN framework 336 including a trained hVAE 338 and a trained attribute-aware generator 340 for generating stylized images from real portrait images. In one example, the trained attribute-aware generator 340 can be implemented by another device instead of the stylized training and conversion server 302 to perform the operation of generating stylized images from real portrait images. Alternatively, or in addition, the stylized training and conversion server 302 may receive an input of an image 324 and generate a stylized image 334. The stylized image 334 may be recognizable as the input subject's identity and may preserve the subject's pose and expression. In addition, the stylized image 334 may be rendered in a style that is consistent with the provided stylistic exemplars, such as the exemplar images 326. In examples, the stylized training and conversion server 302 may perform both model training and stylized image generation, only model training, or only stylized image generation.

Figure 4:
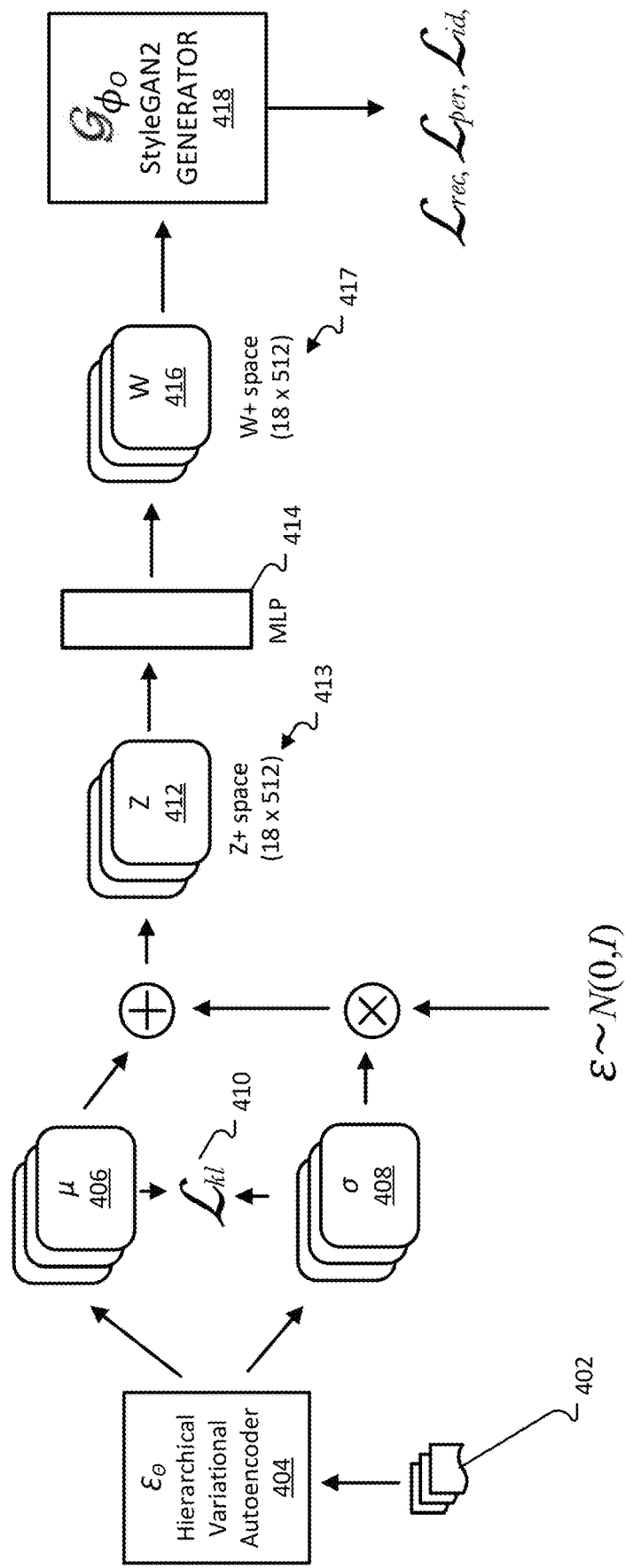
FIG. 4 depicts details associated with training a hierarchical variational autoencoder (hVAE) in accordance with examples of the present disclosure.

FIG. 4 depicts details associated with training a hierarchical variational autoencoder (hVAE) 404 of an AgileGAN framework in accordance with examples of the present disclosure. The AgileGAN framework may be the same as or similar to the AgileGAN model 336 (FIG. 3). The arrows in FIG. 4 indicate dataflows associated with image embedding. Both a multi-layer perceptron (MLLP) 414 and the GAN generator 418 (e.g., StyleGAN-based generator and/or StyleGAN2 generator) include block weights derived from a GAN model (e.g., StyleGAN-based generator and/or StyleGAN2 generator) pre-trained on a dataset such weights are frozen during the training process provided in FIG. 4. The GAN generator 418 may be the same as or similar to the GAN generator 320 (FIG. 3); the hVAE 404 may be the same as or similar to the hVAE 318 (FIG. 3) and once trained, the hVAE 338 (FIG. 3).

The starting baseline for training the AgileGAN framework is a pre-trained GAN model (e.g., StyleGAN-based model and/or StyleGAN2 model), such as the pre-trained GAN model 319 (FIG. 3). The pre-trained GAN model (e.g., StyleGAN-based model and/or StyleGAN2 model) exhibits the property that if random samples from a Gaussian distribution in the Z latent space are acquired, the model can generate images fitting the original training distribution, for example, the original training distribution of the dataset. As previously mentioned, training the AgileGAN model may include two stages. Since the task of training involves using an image as input, a corresponding latent vector for the GAN model (e.g., StyleGAN-based model and/or StyleGAN2 model) model is determined. A front-end encoder, such as the hierarchical variational encoder 404, is trained to map input images (e.g., images 402 which may be the same as or similar to the training images 325) to latent spaces while keeping the back-end GAN generator 418 fixed. In a second process detail in FIG. 6, starting from a copy of the pre-trained GAN model (e.g., StyleGAN-based model and/or StyleGAN2 model), the pre-trained GAN model (e.g., Style-GAN-based model and/or StyleGAN2 model) is fine-tuned such that a sample from a Gaussian distribution in the latent space can generate images that better fit the stylistic exemplars. In examples, the two training stages are executed independently and can be trained in parallel. However, structurally the two training stages share pivot latent spaces (Z+ 413 and W+ 417 described later in this specification), and are also jointly anchored by the fixed GAN generator 418. By separating inversion training and generation training into two stages as previously mentioned, the training does not require paired datasets; the separation of training also enables higher resolutions by reducing a computational load in making backpropagation process more effective and efficient. Thus, rather than fine-tuning the architecture of the AgileGAN model, new style domains can be incorporated by fine-tuning the generators.

The pre-trained GAN model (e.g., StyleGAN-based model and/or StyleGAN2 model) is equipped with two latent spaces: the original latent space Z 412 under a Gaussian distribution, and a less entangled W space 416, which is mapped from Z 412 through a Multi-Layer Perceptron (MLP) f 414. While the original GAN generation (e.g., StyleGAN2) is conducted in a coarse-to-fine manner using several disentangled layers but with the same latent code input to each layer, to enlarge the AgileGAN model's expressiveness, a different latent code is input for each disentangled layer of the AgileGAN model, allowing for individual control. This is equivalent to stacking multiple versions of the original latent space Z 412 to form a new space Z+ 413. Unlike most embedding methods that target single-domain image editing or pixel-level reconstruction by manipulating the W space 416, the Z+ space 413 is utilized at least in part, because stylization uses cross-domain image generation. Cross-domain image generation increases the difficulty when directly embedding into the W space 416 without suffering deterioration in stylization quality, since all codes in the W space 416 may not be appropriate for stylization. Further, the W space 416 is covered by a complex non-Gaussian distribution; directly encoding images into the W space 416 via a network may not correspond appropriately to a Gaussian distribution in the Z+ space 413. Accordingly, as described herein, stylization is addressed via Z+ space 413, as more constrained Gaussian modeling leads to better regularization across different styles.

Traditional autoencoders generally lack the ability to generate new images because the resulting latent space is discontinuous. To force the autoencoder to generate a continuous latent space, an output vector of means 406 and an output vector of standard deviations 408 are utilized. Training the hierarchical variational encoder 404 includes optimizing for Kullback-Leibler divergence 410 (e.g., a mean close to 0 and a standard deviation close to 1) in addition to image reconstruction and other losses which may rely on the means 406 and standard deviations 408. The standard deviation 408 and the mean 406 may be sampled, generating the latent z vector corresponding to an input image of the plurality of input images 402. While a typical variational autoencoder includes an encoder $\varepsilon_\theta$ and a decoder $G\phi$ (e.g., the GAN generator 418) with respective parameters $\theta$ and $\phi$, which are trained jointly to minimize reconstruction error between input image x (e.g., an image of the plurality of training images 402) and output image x (e.g., an image generated by the GAN generator 418), the hVAE 404 for inversion uses a fixed original pre-trained GAN model (e.g., StyleGAN-based model and/or StyleGAN2 model) as the decoder $G\phi o$ (e.g., GAN generator 418), and the hVAE 404 is trained to learn the posterior distribution $q(z|x)$. The encoding parameters $\theta$ may be trained using the stochastic gradient variational Bayes (SGVB) algorithm to solve:

$$\theta^* = \underset{\theta}{\operatorname{argmin}} \mathbb{E}_{z \sim \varepsilon_\theta(x)}[-\log p(x \mid z)] + D_{kl}(\varepsilon_\theta(x) \| p(z))$$

where $D_{kl}$ denotes the Kullback-Leibler (in the following referred to as KL) divergence. The posterior importance/distribution, mapped by the variational autoencoder 404 from x, is modeled as a multivariate Gaussian distribution $q(z|x) = \varepsilon_\theta(x) = N(z_\mu, \operatorname{diag}(z_\sigma^2))$, where $z_\sigma, z_\mu \in \mathbb{R}^{18 \times 512}$ are the multi-dimensional output of $\varepsilon_\theta(x)$, representing the mean and standard deviation respectively in a diagonal matrix form. The prior $p(z) = N(0, I)$ as used in StyleGAN2, and thus the KL divergence can be expressed in the analytic form of:

$$D_{kl}(\varepsilon_\theta(x) \| N(0, I)) = \frac{1}{2} \sum_i (1 + 2\log z_{\sigma,i} - z_{\mu,i}^2 - z_{\sigma,i}^2),$$

where the summation applies across all dimension of $z_\sigma$ and $z_\mu$. Backpropagation is made differentiable via the reparameterization trick, whereby z can be sampled according to:

$$z = z_\mu + \varepsilon \otimes z_\sigma, \varepsilon \sim N(0, I),$$

where $\otimes$ is an element-wise matrix multiplication operator.

Multiple loss functions are used in training the hVAE 404 (e.g., $\varepsilon_\theta$). An $L_2$ loss for reconstruction can be generated as follows:

$$\mathcal{L}_{rec} = \mathcal{L}_2(x, \mathcal{G}_{\phi_o}(\varepsilon_\theta(x)))$$

This measures the pixel-level differences between input image x and generated output $\mathcal{G}_{\phi_o}(\varepsilon_\theta(x))$. In addition, the LPIPS loss is used to learn perceptual-level similarities:

$$\mathcal{L}_{per} = \mathcal{L}_{lpips}(x, \mathcal{G}_{\phi_o}(\varepsilon_\theta(x)))$$

To preserve identity, the facial recognition loss is used as follows:

$$\mathcal{L}_{id} = \mathcal{L}_{arc}(x, \mathcal{G}_{\phi_o}(\varepsilon_\theta(x)))$$

where $\mathcal{L}_{arc}$ is based on the cosine similarity between intermedia features extract from a pre-trained ArcFace recognition network, comparing the intermediate features of the source and output images. The KL divergence loss is defined as:

$$\mathcal{L}_{kl} = D_{kl}(\varepsilon_\theta(x) \| N(0, I)).$$

In combination, the total loss becomes:

$$\mathcal{L} = \mathcal{L}_{rec} + w_{per}\mathcal{L}_{per} + w_{id}\mathcal{L}_{id} + w_{kl}\mathcal{L}_{kl}$$

where $w_{per}$, $w_{id}$, $w_{kl}$ are relative weights for the reconstruction loss, perceptual loss, identity loss, and KL divergence loss, respectively.

Using a GAN model (e.g., StyleGAN-based model and/or StyleGAN2 model) as the base, the intermediate style codes mapped from Z+ are injected into different layers of the StyleGAN2 generator 418 and can semantically control image generation. The style codes broadly fall into three groups: 1) style codes lying in lower layers control coarser attributes like facial shapes, 2) middle layer codes control more localized facial features, while 3) high layer codes correspond to fine details such as reflectance and texture. One straightforward way to embed an input image is to directly estimate the combined latent code 18×512 z in Z+ from a fully connected layer. However, it turns out to be difficult to effectively train such a network.

Figure 5:
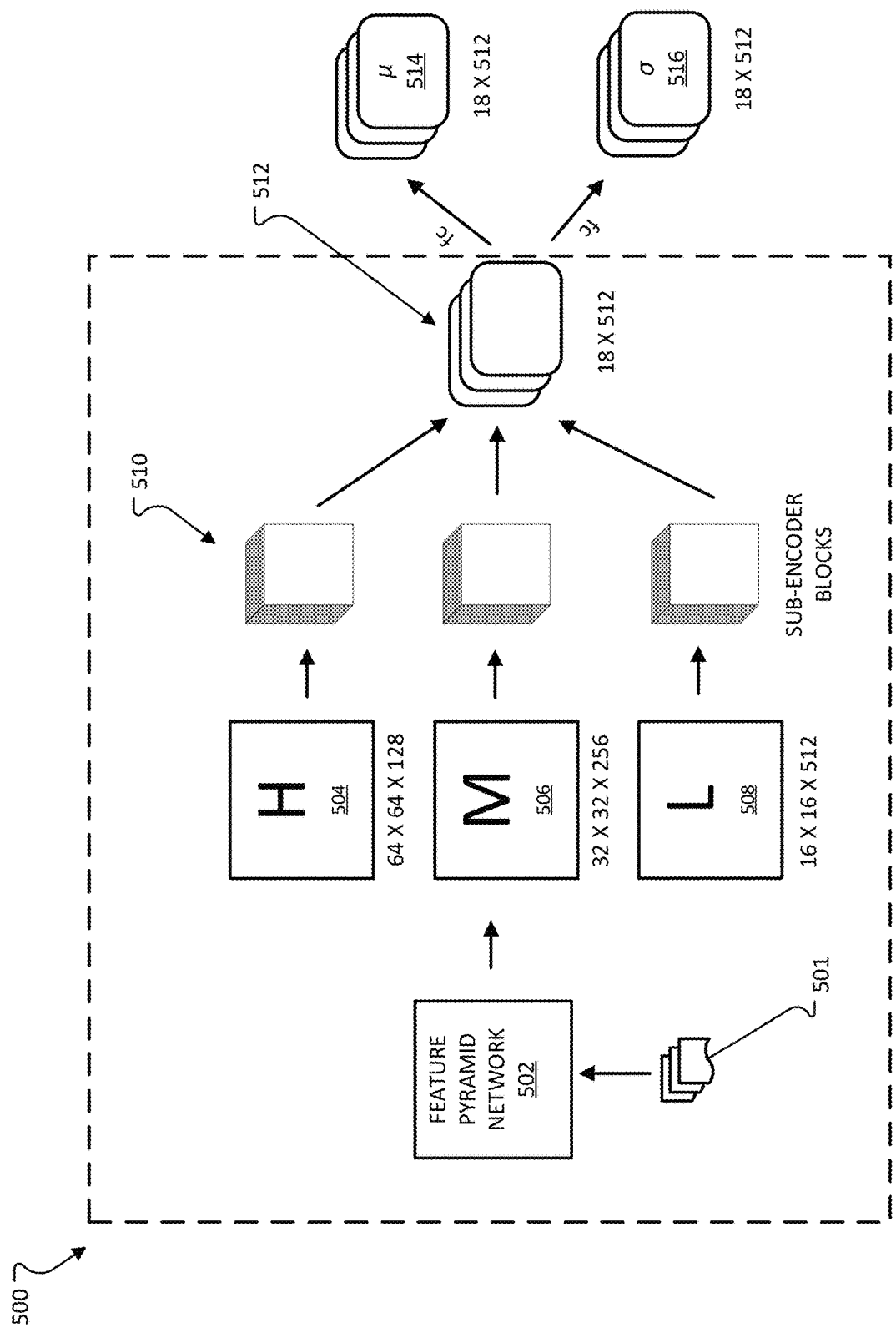
FIG. 5 depicts additional details of the hierarchical variational autoencoder in accordance with examples of the present disclosure.

To address this issue, a hierarchy of a pyramid network is used to capture various levels of detail from different layers. FIG. 5 depicts additional details of the hierarchical variational autoencoder 500 in accordance with examples of the present disclosure. As depicted in FIG. 5, an input image from the plurality of training images 501 at an example resolution of 256×256 is passed through a headless pyramid network 502 to produce multiple levels of feature maps at different sizes. In examples, the multiple levels of feature maps at different sizes correspond to coarse, medium, and fine details. Of course, additional levels and sizes of feature maps are contemplated. Each level's feature map is provided to a separate sub-encoder block 504, 506, 508 to produce a 6×512 code 512. A combined 18×512 code 512 can be passed to the fully connected layers (e.g., FC) to generate the means 514 and standard deviations 516 representing the Gaussian importance distribution in Z+. The hierarchical variational autoencoder 500 may be the same as or similar to the hVAE 404 (FIG. 4) and 318 (FIG. 3). The plurality of training images 501 may be the same as or similar to the plurality of training images 402 (FIG. 2) and 325 (FIG. 3).

Figure 6:
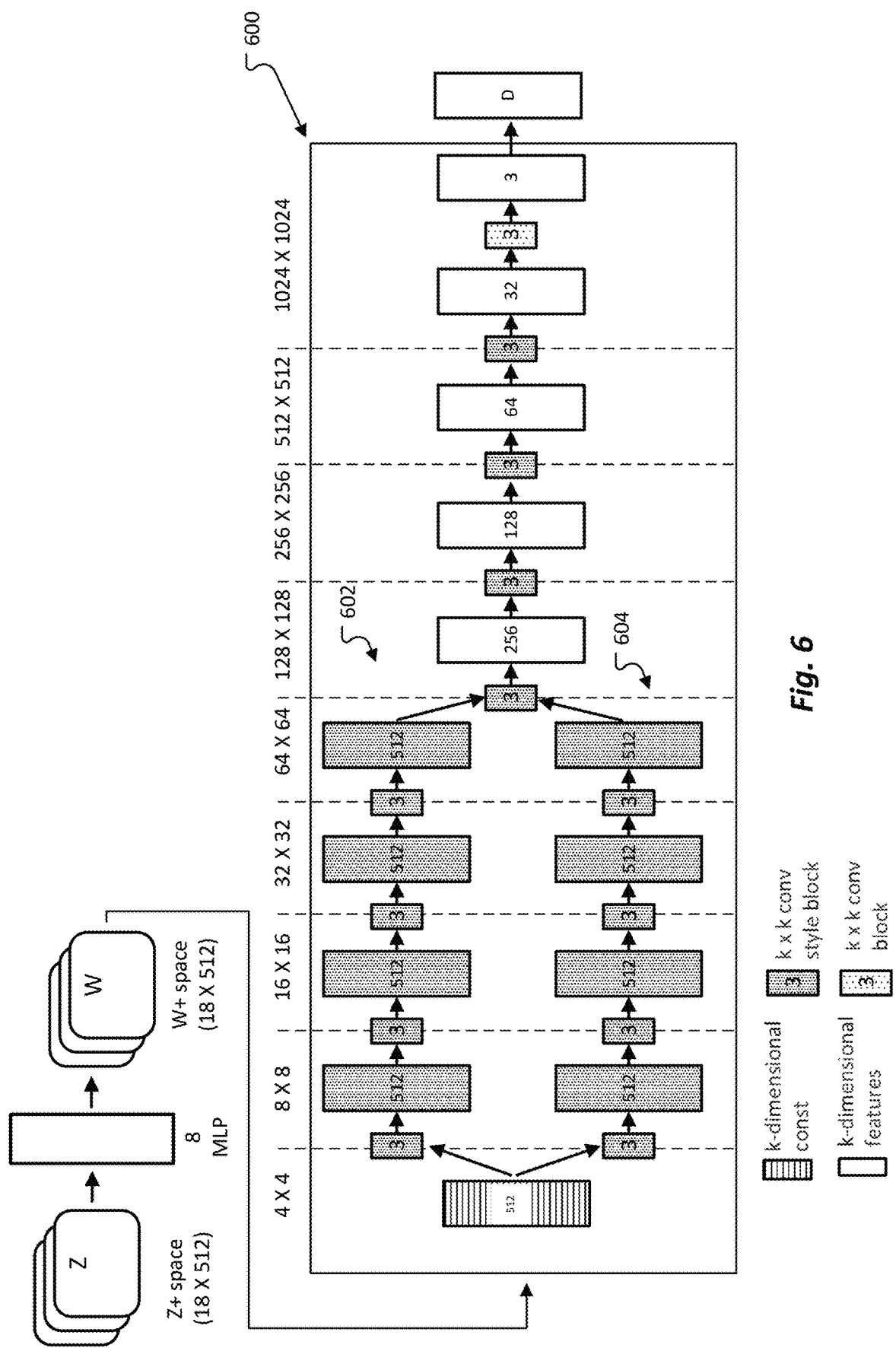
FIG. 6 depicts details of an attribute-aware generator in accordance with examples of the present disclosure.

FIG. 6 depicts details of an attribute-aware generator 600 in accordance with examples of the present disclosure. The attribute-aware generator 600 is based on a StyleGAN2 generator (e.g., StyleGAN2 generator 320 (FIG. 3)), but enhanced with a multi-path structure to better adapt to different features corresponding to known attributes, such as gender. Typically, when artists design characters, they often emphasize attribute-dependent characteristics to enhance appearance. Those attribute-dependent characteristics usually involve different facial geometric ratios as well as different facial features. Directly using the existing single-path StyleGAN2 structure and a single discriminator may not be best at distinguishing these attribute-dependent characteristics, as training several single-path generators to cater to different attributes will increase time and memory. For efficiency, a multi-path structure may be embedded within a same attribute-aware generator $\mathcal{G}_{\phi_t} = \{\mathcal{G}_{\phi_t}^k\}$, $k \in \mathbb{A}$ corresponding to the different attributes $\mathbb{A}$, while using multiple discriminators $D=\{D_k Dk\}$. The attribute-aware generator 600 depicts a first path 602 and a second path 604. Of course, more than two paths are contemplated. Since lower layers of the network guide coarse-level features like facial shapes, while higher layers affect facial reflectance and textures, the multi-path structure is more appropriately embedded within the lower layers. Nonetheless, this structure can also be placed into the higher layers in situations where it may be more appropriate. Other known attributes include, but are not limited to hair color, hair length, glasses/no glasses, emotion, lighting, pose, etc.).

Figure 7:
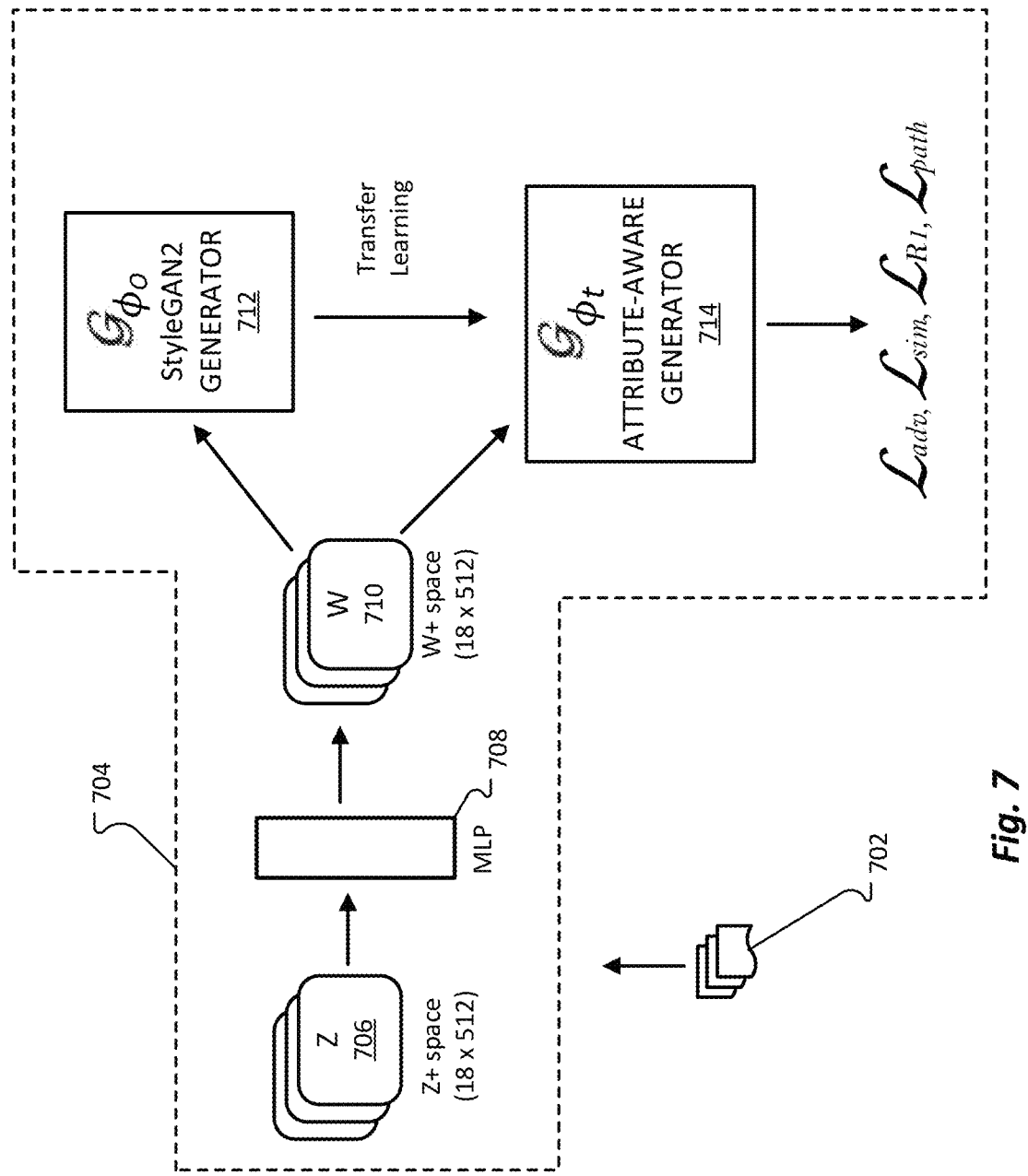
FIG. 7 depicts additional details directed to training the attribute-aware generator in accordance with examples of the present disclosure.

FIG. 7 depicts additional details directed to training the attribute-aware generator 714 in accordance with examples of the present disclosure. As previously mentioned, to mitigate the small dataset problem and better preserve user identity, transfer learning and an early stopping strategy are used to train the attribute-aware generator 714. Each latent code z 706, sampled from a standard Gaussian distribution, is first mapped to an intermediate code w 710 via the multi-layer perceptron 708. Each intermedia code w 710 is forwarded into an affine transform in a style block of the attribute-aware generator 714 and therefore controls the image generation via adaptive instance normalization (AdaIN). When decoding, a constant feature map is first initialized by the attribute-aware generator 714. Multiple paths (e.g., 602, 604 from FIG. 6) are used in the lower layers for attribute specificity, while shared high layers unify texture appearance. Multiple attribute-specific discriminators (e.g., discriminator D in FIG. 6) are used to evaluate a quality of the generated images.

Transfer learning is used to train the attribute-aware generator 714. As artistic portraits share obvious perceptual correspondences to real portraits, AgileGAN relies on the GAN model (e.g., StyleGAN-based model and/or StyleGAN2 model), pre-trained on a dataset, as the initialization weights. The attribute-aware generator 714 is subsequently fine-tuned on the smaller stylized dataset (e.g., plurality of exemplar images 702) using transfer learning from the pre-trained GAN generator 712 (e.g., StyleGAN-based generator and/or StyleGAN2 generator). Benefits of using StyleGAN2 for stylization include but are not limited to: 1) fine tuning can significantly reduce training data and time needed for high quality generation, compared to training from scratch, 2) StyleGAN2's coarse-to-fine generation architecture can support various artistic styles, including geometric and appearance stylization, and 3) the fine-tuned generator $\mathcal{G}_{\phi_t}(z)$ which is derived from the original model $\mathcal{G}_{\phi_0}(z)$ can form a natural correspondence when given the same latent codes, even with different generator parameters of $\phi$. Therefore, once trained, when given an input image x, the inverse mapped latent code z 706 can first be obtained from an hVAE and passed to different stylized generators 714 (trained on different stylized datasets). This results in different stylized images, i.e. $\{\mathcal{G}_{\phi_1}(\varepsilon_\theta(x)), \mathcal{G}_{\phi_2}(\varepsilon_\theta(x)), \mathcal{G}_{\phi_3}(\varepsilon_\theta(x)) \ldots\}$.

During the fine-tuning process of the attribute-aware generator $\mathcal{G}_{\phi_t}$ 714, four loss functions are considered. An adversarial loss function is used to match the distribution of the translated images to the target domain distribution:

$$\mathcal{L}_{adv} = \sum_{k \in \mathbb{A}} \mathbb{E}_{y_k}[\min(0, -1 + D_k(y_k))] + \mathbb{E}_{z \sim N(0,I)}[\min(0, -1 - D_k(\mathcal{G}_{\phi_t}^k(z)))]$$

Where $y_k$ are target style images, classified by attribute k. To preserve the recognizable identity of the generated image, a similarity loss at perceptual level is introduced, given by a modified LPIPS loss. Specifically, differences from the first 9 layers of the VGG16-based LPIPS are discarded and the remaining differences from higher level layers are used. This helps in capturing the facial structural similarity, while ignoring local appearance variation.

$$\mathcal{L}_{sim} = \sum_{k \in \mathbb{A}} \sum_{i=9}^{30} (\mathcal{L}_{lpips}^i(\mathcal{G}_{\phi_t}^k(z), \mathcal{G}_{\phi_0}(z)))$$

To help improve training stability and prevent artifact formations, regularizing terms are employed. For discriminators, R1 regularization may be used.

$$\mathcal{L}_{R1} = \frac{\gamma}{2} \sum_{k \in A} \left( \mathbb{E}_{y_k} \left[ \| \nabla D_k(y_k) \|^2 \right] \right)$$

where $\gamma=10$ is the hyper-parameter for gradient regularization. For the StyleGAN2 generator 712, a standard perceptual path-length regularization $\mathcal{L}_{path}$ from StyleGAN2 712 is used to aid reliability and behaviors consistency in generative models.

The generator and discriminators of the pre-trained StyleGAN model are jointly trained to optimize the combine objective of:

$$\min_{\phi} \max_{D} \mathcal{L}_{adv} + w_{sim}\mathcal{L}_{sim} + w_{R1}\mathcal{L}_{R1} + w_{path}\mathcal{L}_{path}$$

where $w_{sim}=0.5$, $w_{R1}=5$, $w_{path}=2$ are relative weights for the adversarial loss, similarity loss, and regularization loss, respectively.

A potential issue with small datasets is that the discriminator of the pre-trained GAN model (e.g., StyleGAN-based model and/or StyleGAN2 model) may overfit the training examples, causing instability and degradation in GAN training. To mitigate this issue, an early stopping strategy is adopted to stop training once a desired stylization effect has been achieved. Increasing the number of iterations may lead to an increased deviation from the original input expression. Thus, to strike a balance between input fidelity and stylistic fit, training can be stopped early (e.g., after 1200 iterations).

Figure 8:
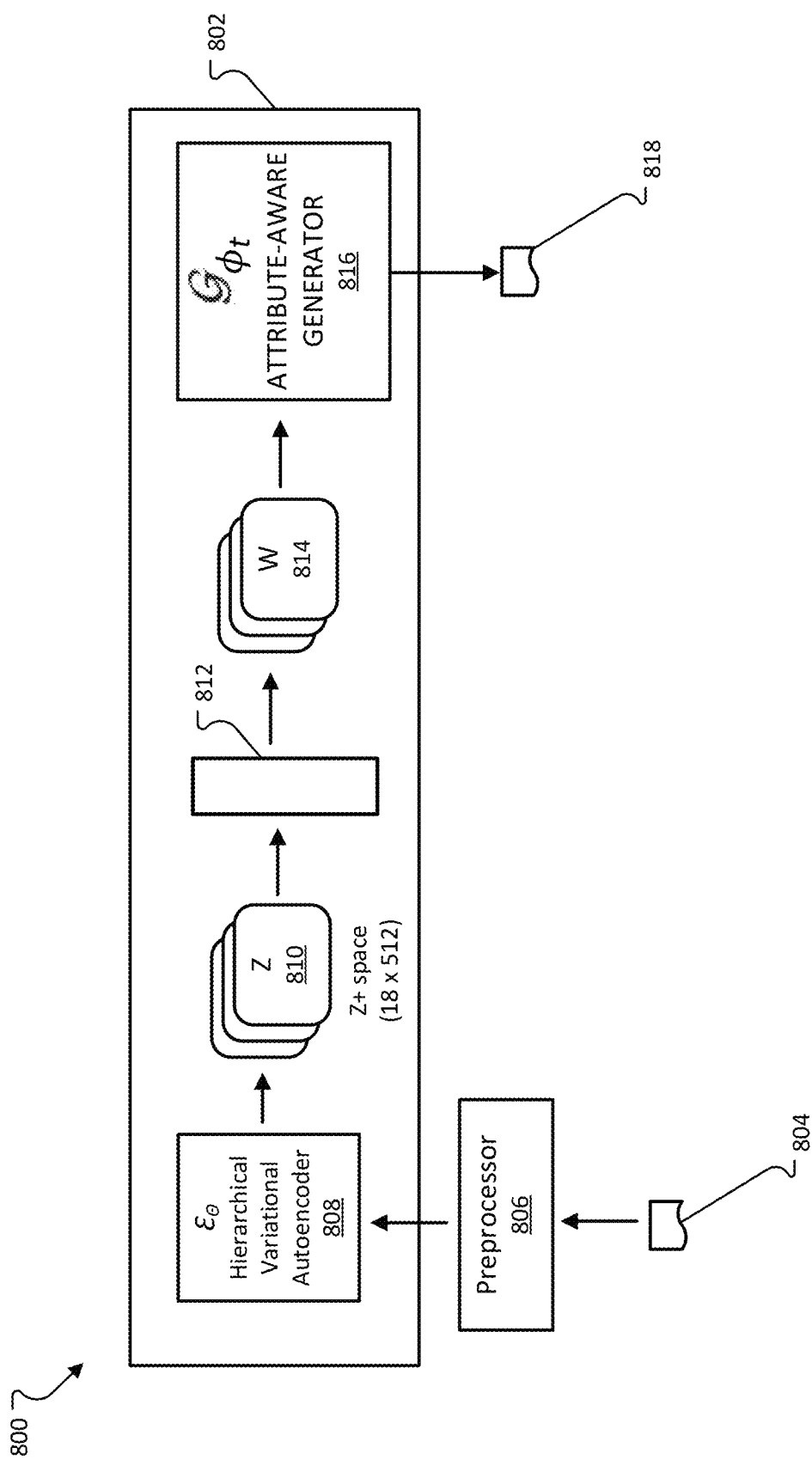
FIG. 8 depicts details directed to the inference process of the trained AgileGAN model in accordance with examples of the present disclosure.

FIG. 8 depicts details directed to the inference process of the trained AgileGAN model 802 in accordance with examples of the present disclosure. The trained AgileGAN model 802 may be the same as or similar to the trained AgileGAN model 336 (FIG. 3). More specifically, given an input face image 804, the input image 804 is preprocessed at the preprocessor 806 to warp and normalize the input image to a 256×256 resolution based on its landmarks. The processed image is then encoded by the trained hierarchical variational autoencoder 808 to obtain the latent Gaussian posterior distribution q(z|x). The trained hierarchical variational autoencoder 808 may be the same as or similar to the hVAE 338 (FIG. 3). Since this posterior/importance distribution is relevant during the training of the hierarchical variational autoencoder 808, instead of using a sample from this distribution during inference, the distribution mean is used as the latent code z 810, which better maintains temporal consistency. This z code 810 is then mapped to the w code 814 via the multi-layer perceptron 812, and then passed to a chosen stylized generator, such as the trained attribute-aware generator 816 trained using previous exemplar images, to generate a stylized image 818. Though a variety of resolutions are possible, the stylized image 818 may be in a 1024×1024 resolution. In some cases, there may be high frequency artifacts generated by the attribute-aware generator 816. In these cases, multiple instances may be sampled from the imputed Gaussian distribution (e.g., z space 810), leading to multiple output images 818. An output image 818 without artifacts can be selected, either manually or by selecting the output image 818 having the smallest average perceptual distance among the output images. To account for some attributes, an external pre-trained corresponding attribute detector network may be used to select one or more of the output images 818 best embodying the desired attribute(s). In total, the inference stage may take less than 130 ms per image.

Figure 9:
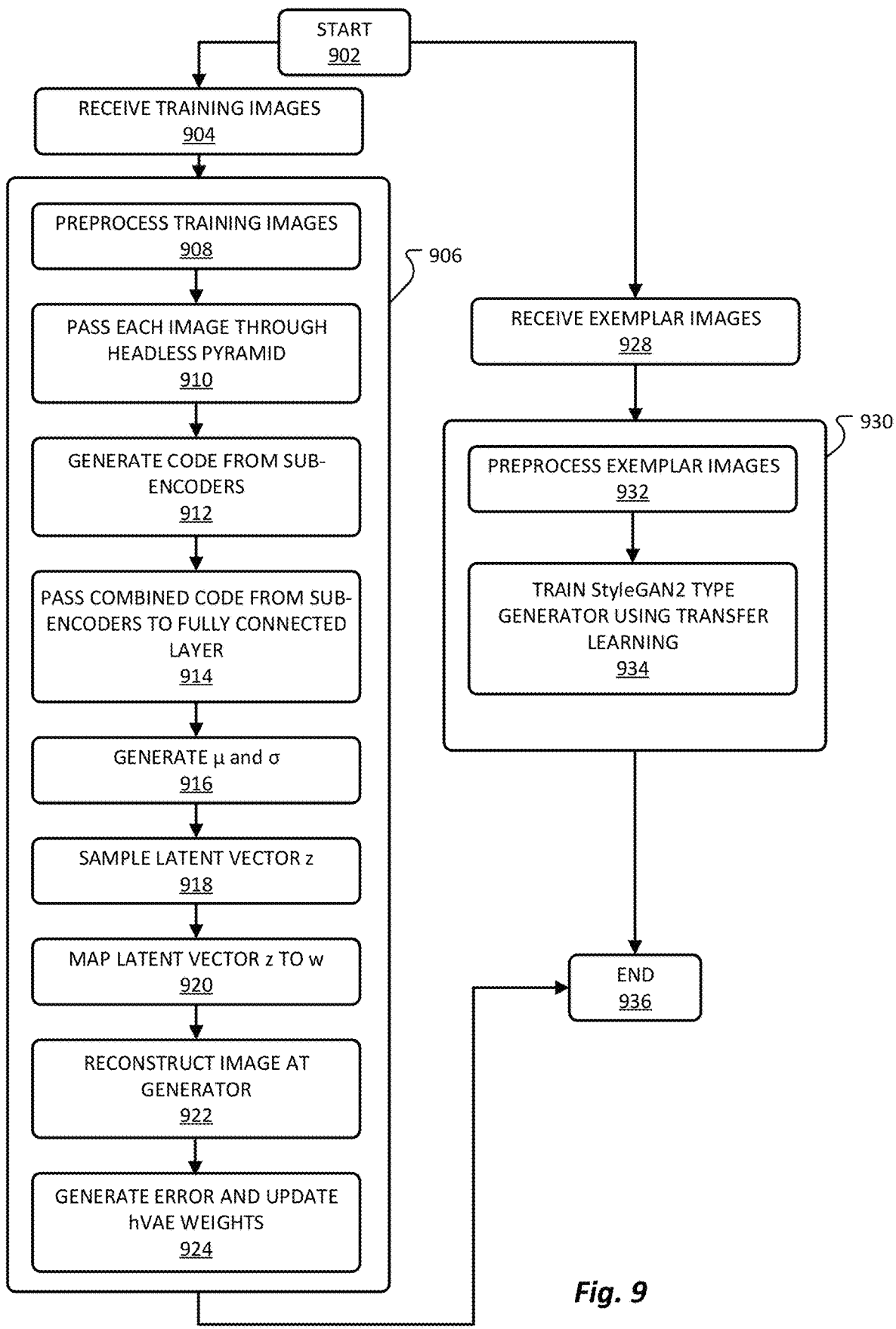
FIG. 9 depicts details of a method for training an Agile-GAN model in accordance with examples of the present disclosure.

FIG. 9 depicts details of a method 900 for training an AgileGAN model in accordance with examples of the present disclosure. A general order for the steps of the method 900 is shown in FIG. 9. Generally, the method 900 starts at 902 and ends at 912. The method 900 may include more or fewer steps or may arrange the order of the steps differently than those shown in FIG. 9. The method 900 can be executed as a set of computer-executable instructions executed by a computer system and encoded or stored on a computer readable medium. In examples, aspects of the method 900 are performed by one or more processing devices, such as a computer or server. Further, the method 900 can be performed by gates or circuits associated with a processor, Application Specific Integrated Circuit (ASIC), a field programmable gate array (FPGA), a system on chip (SOC), a neural processing unit, or other hardware device. Hereinafter, the method 900 shall be explained with reference to the systems, components, modules, software, data structures, user interfaces, etc. described in conjunction with FIGS. 1-8.

The method starts at 902, where flow may proceed to one or both of 904 and/or 928. At 904, a plurality of training images is received. The plurality of training images may be the same as or similar to the plurality of training images 345 (FIG. 3) and/or 402 (FIG. 4) and may be different from a plurality of images used to train an initial GAN model (e.g., StyleGAN-based model and/or StyleGAN2 model). From 904, the method 900 may proceed to 906, where an hVAE is trained using the plurality of received training images and a pre-trained GAN model (e.g., StyleGAN-based model and/or StyleGAN2 model). More specifically, the training images may be preprocessed at 908 to an input image resolution of 256×256 for example, and then passed through a headless pyramid network at 910 to produce multiple levels of feature maps at different sizes. For example, three levels of feature maps corresponding to coarse, medium and fine details may be obtained. At 912, each level's feature map then goes through a separate sub-encoder block to produce a code, such as a 6×512 code. The combined code from each of the layers (e.g., 18×512 code) is passed to the fully connected layers at 914 to generate the means and standard deviations at 916 representing the Gaussian importance distribution in Z+ space. A latent vector z may be sampled from the Z+ space at 918 and mapped to w in a W+ space at 920 via a multi-perceptron layer. The w vector may be provided to a pre-trained StyleGAN2 generator to reconstruct an image based on the latent vector z to obtain an output image at 922. The differences between the output image and the input image can be used to update the weights associated with the hVAE at 924. Once trained, the output of the hVAE may be provided to a trained attribute-aware generator.

In examples where the method 900 proceeds to 928, a plurality of exemplar images are received. The plurality of exemplar images may be the same as or similar to the plurality of exemplar images 206 (FIG. 2), 326 (FIG. 3), and/or 702 (FIG. 7). The method 900 may proceed to fine-tune an attribute-aware generator at 930. More specifically, the exemplar images may first be preprocessed at 932 by extracting landmarks, conducting normalization by aligning position (such as eye position), and cropped to a specific input size (e.g., 1024×1024). At 934, the processed exemplar images are used to train an attribute-aware generator using a GAN model (e.g., StyleGAN-based model and/or StyleGAN2 model) pre-trained on real portrait datasets as the initialization weights for the generator and the discriminators. Using transfer learning, the weights are fine-tuned with the exemplar images. The method 900 may end at 936.

Figure 10:
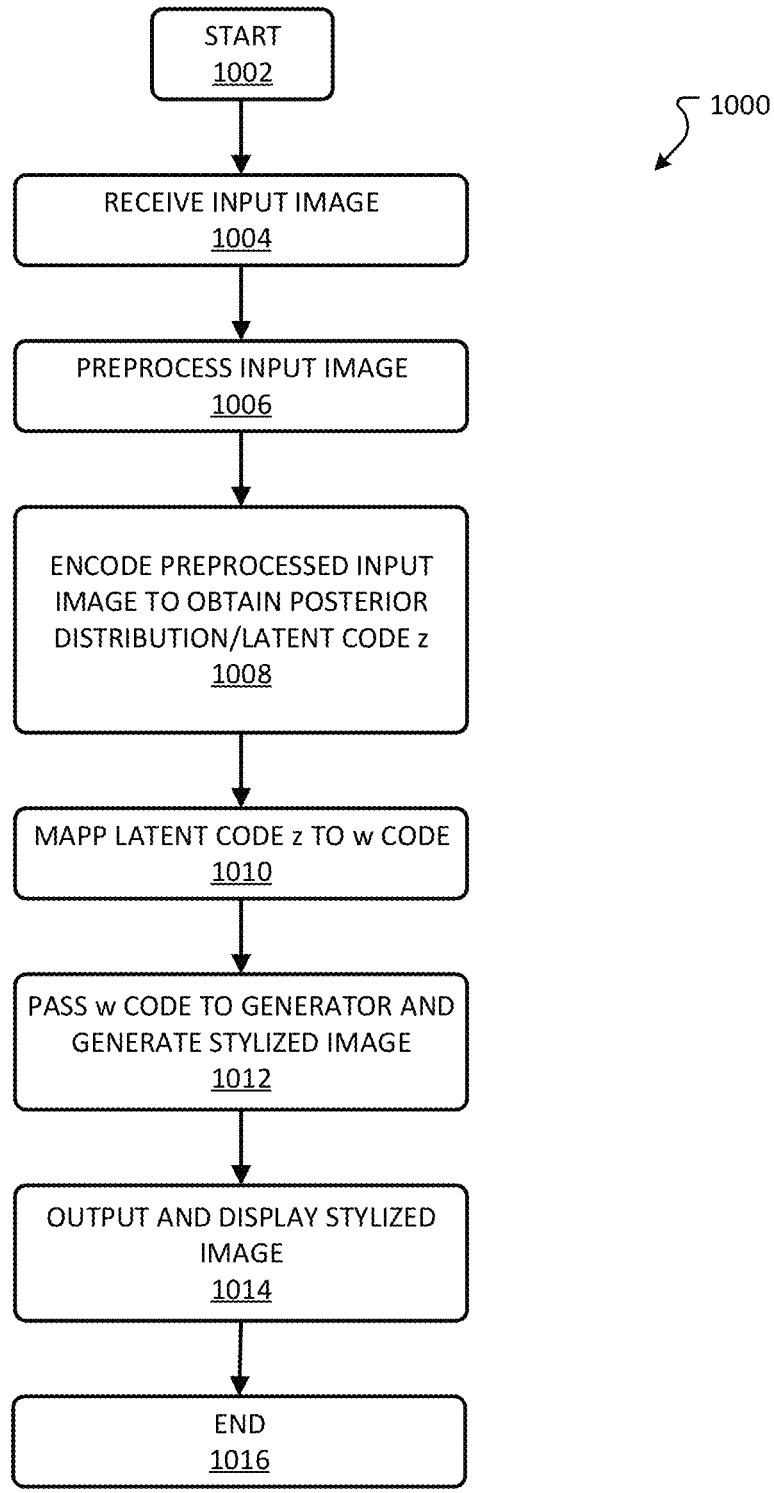
FIG. 10 depicts details of a method for generating a stylized image from an input image in accordance with examples of the present disclosure.

FIG. 10 depicts details of a method 1000 for generating a stylized image from an input image in accordance with examples of the present disclosure. A general order for the steps of the method 1000 is shown in FIG. 10. Generally, the method 1000 starts at 1002 and ends at 1016. The method 1000 may include more or fewer steps or may arrange the order of the steps differently than those shown in FIG. 10. The method 1000 can be executed as a set of computer-executable instructions executed by a computer system and encoded or stored on a computer readable medium. In examples, aspects of the method 1000 are performed by one or more processing devices, such as a computer or server. Further, the method 1000 can be performed by gates or circuits associated with a processor, Application Specific Integrated Circuit (ASIC), a field programmable gate array (FPGA), a system on chip (SOC), a neural processing unit, or other hardware device. Hereinafter, the method 1000 shall be explained with reference to the systems, components, modules, software, data structures, user interfaces, etc. described in conjunction with FIGS. 1-9.

The method starts at 1002, where flow may proceed to 1004. At 1004, an image to be stylized is received. For example, an input image that is the same or similar to the input image 212 may be received by an AgileGAN model. The method 1000 may proceed to preprocess the received image at 1006. At 1008 an inversion process may occur where the preprocessed image may be then encoded by an hVAE trained by method 900 for example, to get the posterior distribution, or mean, as the latent code z. At 1010, the latent code z is mapped to the w code and then passed to a chosen stylized generator to generate a stylized image at 1012. The stylized image may then be output to and displayed at a display device at 1014. The method 1000 may end at 1016.

Figure 11:
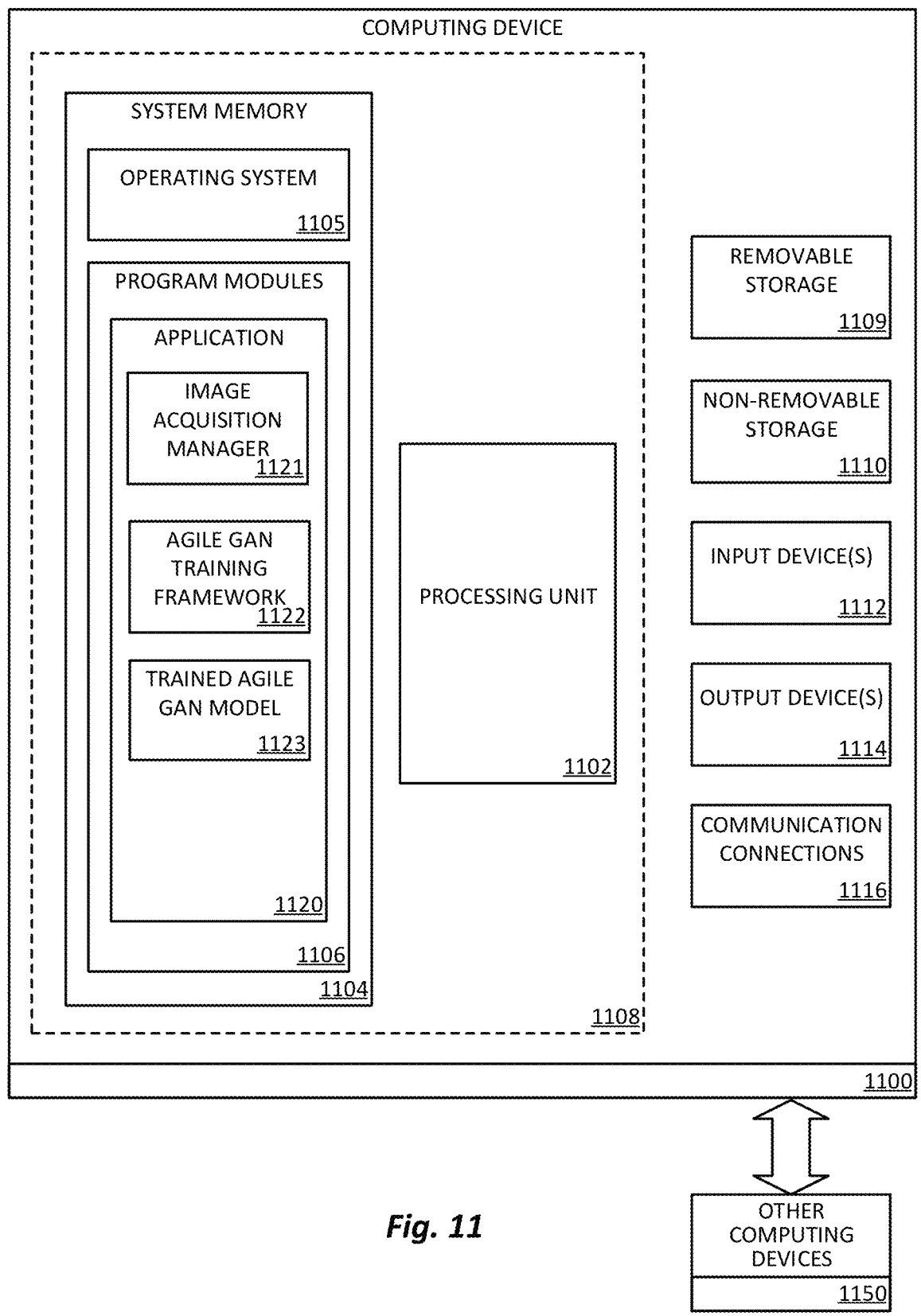
FIG. 11 depicts a block diagram illustrating physical components (e.g., hardware) of a computing system with which aspects of the disclosure may be practiced.
Figure 12A:
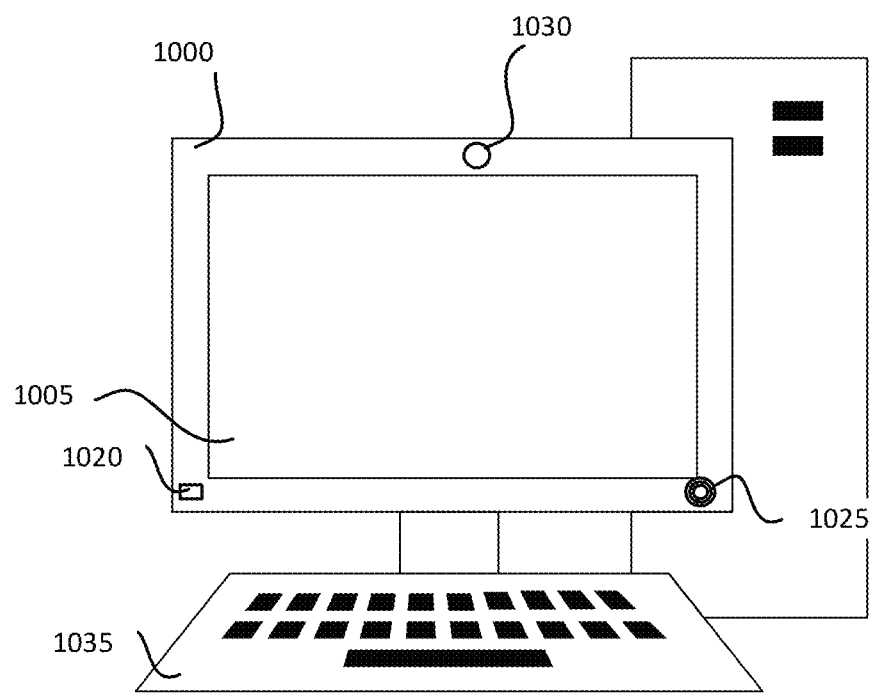
FIGS. 12A-12B illustrate a computing device with which embodiments of the disclosure may be practiced.
Figure 12B:
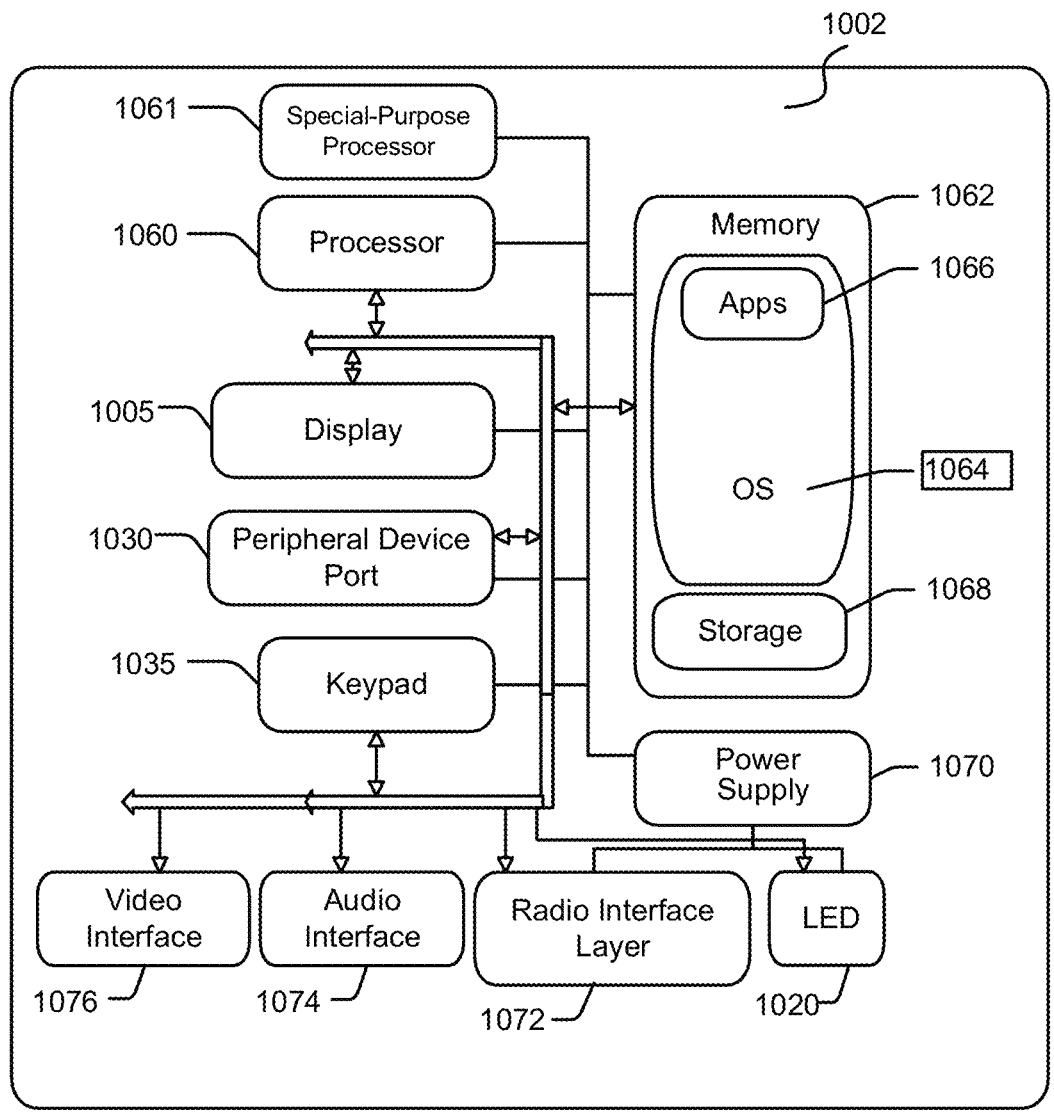
Figure 13:
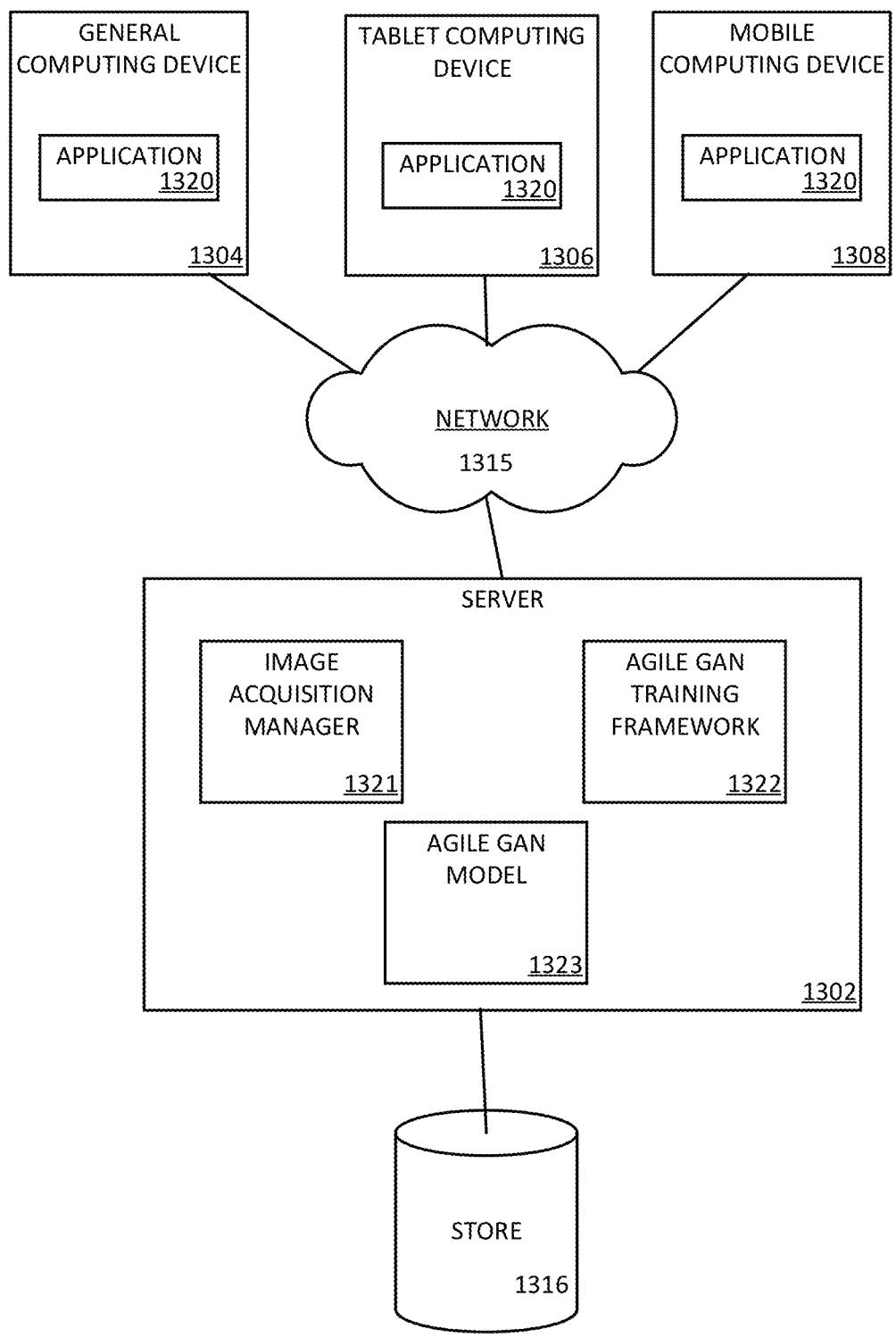
FIG. 13 illustrates one aspect of the architecture of a system for processing data.

FIGS. 11-13 and the associated descriptions provide a discussion of a variety of operating environments in which aspects of the disclosure may be practiced. However, the devices and systems illustrated and discussed with respect to FIGS. 11-13 are for purposes of example and illustration and are not limiting of a vast number of computing device configurations that may be utilized for practicing aspects of the disclosure, described herein.

FIG. 11 is a block diagram illustrating physical components (e.g., hardware) of a computing system 1100 with which aspects of the disclosure may be practiced. The computing device components described below may be suitable for the computing and/or processing devices described above. In a basic configuration, the computing system 1100 may include at least one processing unit 1102 and a system memory 1104. Depending on the configuration and type of computing device, the system memory 1104 may comprise, but is not limited to, volatile storage (e.g., random-access memory (RAM)), non-volatile storage (e.g., read-only memory (ROM)), flash memory, or any combination of such memories.

The system memory 1104 may include an operating system 1105 and one or more program modules 1106 suitable for running software application 1120, such as one or more components supported by the systems described herein. As examples, system memory 1104 may include the image acquisition manager 1121, the AgileGAN model 1122, and the trained AgileGAN model 1123. The image acquisition manager 1121 may be the same as or similar to the image acquisition manager 316 previously described. The AgileGAN training framework 1122 may be the same as or similar to the AgileGAN training framework 317 previously described. The trained AgileGAN model 1123 may be the same as or similar to the trained AgileGAN model 336 previously described. The operating system 1105, for example, may be suitable for controlling the operation of the computing system 1100.

Furthermore, embodiments of the disclosure may be practiced in conjunction with a graphics library, other operating systems, or any other application program and is not limited to any particular application or system. This basic configuration is illustrated in FIG. 11 by those components within a dashed line 1108. The computing system 1100 may have additional features or functionality. For example, the computing system 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 (e.g., software applications 1120) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided programs, etc.

Furthermore, embodiments of the disclosure may be practiced in an electrical circuit discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality, all of which are integrated (or "burned") onto the chip substrate as a single integrated circuit. When operating via an SOC, the functionality, described herein, with respect to the capability of client to switch protocols may be operated via application-specific logic integrated with other components of the computing system 1100 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing system 1100 may also have one or more input device(s) 1112 such as a keyboard, a mouse, a pen, a sound or voice input device, a touch or swipe input device, etc. The one or more input device 1112 may include an image sensor. The image sensor may acquire an image and provide the image to the image acquisition manager 1121. The output device(s) 1114 such as a display, speakers, a printer, etc. may also be included. The aforementioned devices are examples and others may be used. The computing system 1100 may include one or more communication connections 1116 allowing communications with other computing devices/systems 1150. Examples of suitable communication connections 1116 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable, and non-removable media implemented in any method or technology for storage of information, such as computer readable instructions, data structures, or program modules. The system memory 1104, the removable storage device 1109, and the non-removable storage device 1110 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing system 1100. Any such computer storage media may be part of the computing system 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 12A-12B illustrate a computing system 1200, for example, a mobile telephone, a smart phone, wearable computer (such as a smart watch), a tablet computer, a desktop computer, a laptop computer, and the like, with which examples of the disclosure may be practiced. With reference to FIG. 12A, one aspect of a computing system 1200 for implementing the aspects is illustrated. In a basic configuration, the computing system 1200 is a desktop computer having both input elements and output elements. The computing system 1200 typically includes a display 1205, which may also function as an input device (e.g., a touch screen display). The computing system 1200 may also include a keypad 1235. The keypad 1235 may be a physical keypad or a "soft" keypad generated on the touch screen display.

In various embodiments, the output elements include the display 1205 for showing a graphical user interface (GUI), a visual indicator 1220 (e.g., a light-emitting diode), and/or an audio transducer 1225 (e.g., a speaker). In yet another aspect, the computing system 1200 incorporates input and/or output ports, such as an audio input (e.g., a microphone jack), an audio output (e.g., a headphone jack), and a video output (e.g., an HDMI port) for sending signals to or receiving signals from an external device.

FIG. 12B is a block diagram illustrating the architecture of one aspect of a mobile computing system. That is, the computing system 1200 can incorporate a system (e.g., an architecture) 1202 to implement some aspects. In one embodiment, system 1202 is implemented as a "computing system" capable of running one or more applications (e.g., browser, e-mail, calendaring, contact managers, messaging clients, games, and media clients/players). In some aspects, system 1202 is integrated as a computing system, such as a desktop computer.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, maps programs, and so forth. System 1202 also includes a nonvolatile storage area 1268 within the memory 1262. The nonvolatile storage area 1268 may be used to store persistent information that should not be lost if the system 1202 is powered down. The application programs 1266 may use and store information in the nonvolatile storage area 1268, such as e-mail or other messages used by an e-mail application, and the like. A synchronization application (not shown) also resides on system 1202 and is programmed to interact with a corresponding synchronization application resident on a host computer to keep the information stored in the nonvolatile storage area 1268 synchronized with corresponding information stored at the host computer. As should be appreciated, other applications may be loaded into the memory 1262 and run on the computing system 1200 described herein (e.g., search engine, extractor module, etc.).

The system 1202 has a power supply 1270, which may be implemented as one or more batteries. The power supply 1270 might further include an external power source, such as an AC adapter or a powered docking cradle that supplements or recharges the batteries.

The system 1202 may also include a radio interface layer 1272 that performs the function of transmitting and receiving radio frequency communications. The radio interface layer 1272 facilitates wireless connectivity between the system 1202 and the "outside world" via a communications carrier or service provider. Transmissions to and from the radio interface layer 1272 are conducted under the control of the operating system 1264. In other words, communications received by the radio interface layer 1272 may be disseminated to the application programs 1266 via the operating system 1264, and vice versa.

The system 1202 may further include a video interface 1276 that enables an operation of an on-board camera 1230 to record still images, video stream, and the like. A computing system 1200 implementing the system 1202 may have additional features or functionality. For example, the computing system 1200 may also include additional data storage devices (removable and/or non-removable) such as magnetic disks, optical disks, or tape. Such additional storage is illustrated in FIG. 12B by the nonvolatile storage area 1268.

Data/information generated or captured by the computing system 1200 and stored via the system 1202 may be stored locally on the computing system 1200, as described above, or the data may be stored on any number of storage media that may be accessed by the device via the radio interface layer 1272 or via a wired connection between the computing system 1200 and a separate computing system associated with the computing system 1200, for example, a server computer in a distributed computing network, such as the Internet. As should be appreciated, such data/information may be accessed via the computing system 1200 via the radio interface layer 1272 or via a distributed computing network. Similarly, such data/information may be readily transferred between computing systems for storage and use according to well-known data/information transfer and storage means, including electronic mail and collaborative data/information sharing systems.

FIG. 13 illustrates one aspect of the architecture of a system for processing data received at a computing system from a remote source, such as a personal computer 1304, tablet computing device 1306, or mobile computing device 1308, as described above. The personal computer 1304, tablet computing device 1306, or mobile computing device 1308 may include one or more applications 1320; such applications may include but are not limited to the image acquisition manager 1321, the AgileGAN training framework 1322, and the trained AgileGAN model 1323. Content at a server device 1302 may be stored in different communication channels or other storage types. For example, various documents may be stored using a directory service, a web portal, a stylized image service, an instant messaging store, or social networking services.

One or more of the previously described program modules 1106 or software applications 1120 may be employed by server device 1302 and/or the personal computer 1304, tablet computing device 1306, or mobile computing device 1308, as described above. For example, the server device 1302 may include the image acquisition manager 1321, the AgileGAN training framework 1322, and the trained AgileGAN model 1323. The image acquisition manager 1321 may be the same as or similar to the image acquisition manager 316 and 1121 previously described. The AgileGAN training framework 1322 may be the same as or similar to the AgileGAN training framework 317 and 1122 previously described. The trained AgileGAN model 1323 may be the same as or similar to the trained AgileGAN model 336 and 1323 previously described.

The server device 1302 may provide data to and from a client computing device such as a personal computer 1304, a tablet computing device 1306 and/or a mobile computing device 1308 (e.g., a smart phone) through a network 1315. By way of example, the computer system described above may be embodied in a personal computer 1304, a tablet computing device 1306 and/or a mobile computing device 1308 (e.g., a smart phone). Any of these examples of the computing devices may obtain content from the store 1316, in addition to receiving graphical data useable to be either pre-processed at a graphic-originating system, or post-processed at a receiving computing system.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The present disclosure relates to systems and methods for generating a stylized image according to at least the examples provided in the sections below:

(A1) In one aspect, some examples include a method for generating a stylized image. The method may include receiving an input image; encoding the input image using a variational autoencoder to obtain a latent vector; providing the latent vector to a generative adversarial network (GAN) generator; generating, by the GAN generator, a stylized image from the GAN generator; and providing the stylized image as an output.

(A2) In some examples of A1, the method includes receiving a plurality of exemplar images; training the GAN generator using transfer learning based on the received plurality of exemplar images; and terminating the process of training when the output of the GAN generator satisfies a predetermined condition at a first time.

(A3) In some examples of A1-A2, the method includes receiving a plurality of training images; and training the variational autoencoder while keeping the weights of the pre-trained GAN network fixed.

(A4) In some examples of A1-A3, the latent vector is sampled from a standard Gaussian distribution.

(A5) In some examples of A1-A2, the method includes mapping the latent vector to an intermediate vector; and forwarding the intermediate vector to an affine transform within a style block of the GAN generator.

(A6) In some examples of A1-A5, the GAN generator includes a multi-path structure corresponding to two or more different attributes.

(A7) In some examples of A1-A6, the method includes passing the received input image through a headless pyramid network to produce multiple levels of features maps at different sizes; and combining an encoding of each level's respective feature map to obtain the latent vector.

(A8) In some examples of A1-A7, the GAN generator comprises a StyleGAN2 generator.

In yet another aspect, some examples include a computing system including one or more processors and memory coupled to the one or more processors, the memory storing one or more instructions which when executed by the one or more processors, causes the one or more processors perform any of the methods described herein (e.g., A1-A8 described above).

In yet another aspect, some examples include a non-transitory computer-readable storage medium storing one or more programs for execution by one or more processors of a storage device, the one or more programs including instructions for performing any of the methods described herein (e.g., A1-A8 described above).

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for generating a stylized image, the method comprising:
   receiving an input image;
   encoding the input image using a variational autoencoder to obtain a latent vector by:
      passing the received input image through a headless pyramid network to produce multiple levels of features maps at different sizes;
      encoding, for each of the levels of features maps at different sizes, each level's respective feature map at the different size with a separate encoder of a plurality of encoders to produce a code, and
      combining the encoded code of each level's respective feature map to obtain the latent vector;
   providing the latent vector to a pre-trained generative adversarial network (GAN) model;
   generating, by the pre-trained GAN model, a stylized image from the pre-trained GAN model, the generated stylized image being a cartoon style image of the input image; and
   providing the stylized image as an output,
   wherein the pre-trained GAN model includes a multi-path structure corresponding to two or more different attributes.

2. The method of claim 1, further comprising:
   receiving a plurality of exemplar images;
   training a GAN model using transfer learning based on the received plurality of exemplar images; and
   terminating the process of training when the output of the GAN model satisfies a predetermined condition at a first time to produce the pre-trained GAN model.

3. The method of claim 2, further comprising:
   receiving a plurality of training images; and
   training the variational autoencoder while keeping the weights of the pre-trained GAN model fixed.

4. The method of claim 1, wherein the latent vector is sampled from a standard Gaussian distribution.

5. The method of claim 4, further comprising:
   mapping the latent vector to an intermediate vector; and
   forwarding the intermediate vector to an affine transform within a style block of the pre-trained GAN model.

6. The method of claim 1, wherein the pre-trained GAN model comprises a pre-trained StyleGAN2 model.

7. A system configured to generate a stylized image, the system comprising:
   a processor; and
   memory including instructions, which when executed by the processor, causes the processor to:
      receive an input image;
      encode the input image using a variational autoencoder to obtain a latent vector by:
         passing the received input image through a headless pyramid network to produce multiple levels of features maps at different sizes;
         encoding, for each of the levels of features maps at different sizes, each level's respective feature map at the different size with a separate encoder of a plurality of encoders to produce a code, and
         combining the encoded code of each level's respective feature map to obtain the latent vector;
      provide the latent vector to a pre-trained generative adversarial network (GAN) model;
      generate, by the pre-trained GAN model, a stylized image from the pre-trained GAN model, the generated stylized image being a cartoon style image of the input image; and
      provide the stylized image as an output,
   wherein the pre-trained GAN model includes a multi-path structure corresponding to two or more different attributes.

8. The system of claim 7, wherein the instructions, when executed by the processor, cause the processor to:
   receive a plurality of exemplar images;
   train the GAN model using transfer learning based on a pre-trained GAN model and the received plurality of exemplar images and
   terminate the process of training when the output of the GAN model satisfies a predetermined condition at a first time to produce the pre-trained GAN model.

9. The system of claim 8, wherein the instructions, when executed by the processor, cause the processor to:
   receive a plurality of training images; and
   training the variational autoencoder while keeping the weights of the pre-trained GAN model fixed.

10. The system of claim 7, wherein the latent vector is sampled from a standard Gaussian distribution.

11. The system of claim 10, wherein the instructions, when executed by the processor, cause the processor to:
    map the latent vector to an intermediate vector; and
    forward the intermediate vector to an affine transform within a style block of the pre-trained GAN model.

12. The system of claim 7, wherein the pre-trained GAN model comprises a pre-trained StyleGAN2 model.

13. A non-transitory computer-readable storage medium including instructions, which when executed by a processor, cause the processor to:
    receive an input image;
    encode the input image using a variational autoencoder to obtain a latent vector by:
       passing the received input image through a headless pyramid network to produce multiple levels of features maps at different sizes;
       encoding, for each of the levels of features maps at different sizes, each level's respective feature map at the different size with a separate encoder of a plurality of encoders to produce a code, and
       combining the encoded code of each level's respective feature map to obtain the latent vector;
    provide the latent vector to a pre-trained generative adversarial network (GAN) model;
    generate, by the pre-trained GAN model, a stylized image from the pre-trained GAN model, the generated stylized image being a cartoon style image of the input image; and
    provide the stylized image as an output,
    wherein the pre-trained GAN model includes a multi-path structure corresponding to two or more different attributes.

14. The non-transitory computer-readable storage medium of claim 13, wherein the instructions, which when executed by a processor, cause the processor to:

map a latent vector sampled from a standard Gaussian distribution to an intermediate vector; and forward the intermediate vector to an affine transform within a style block of the pre-trained GAN model.

15. The non-transitory computer-readable storage medium of claim 14, wherein the combined code from each level's respective feature map to obtain the latent vector is passed to fully connected layers to generate means and standard deviations representing Gaussian importance distribution in a Z+ space.

16. The non-transitory computer-readable storage medium of claim 13, wherein the instructions, which when executed by a processor, cause the processor to:

receive a plurality of exemplar images including cartoon characters;

train GAN model using transfer learning based on the received plurality of exemplar images; and terminating the process of training after at most 1200 interactions to produce the pre-trained GAN model.

17. The non-transitory computer-readable storage medium of claim 13, wherein the pre-trained GAN model comprises a pre-trained StyleGAN2 model.

\* \* \* \* \*